United States Patent
Takahashi et al.

(10) Patent No.: US 10,553,872 B2
(45) Date of Patent: Feb. 4, 2020

(54) BINDER FOR ELECTRODE IN LITHIUM SECONDARY CELL, ELECTRODE MANUFACTURED USING SAID BINDER, AND LITHIUM SECONDARY CELL IN WHICH SAID ELECTRODE IS USED

(71) Applicant: DAI-ICHI KOGYO SEIYAKU CO., LTD., Kyoto (JP)

(72) Inventors: Katsuo Takahashi, Kyoto (JP); Shuichi Ito, Kyoto (JP); Takeshi Miyamura, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 0 days.

(21) Appl. No.: 15/981,251

(22) Filed: May 16, 2018

(65) Prior Publication Data

US 2018/0261846 A1  Sep. 13, 2018

Related U.S. Application Data

(63) Continuation of application No. 14/908,857, filed as application No. PCT/JP2014/004074 on Aug. 4, 2014, now Pat. No. 10,003,076.

(30) Foreign Application Priority Data

Aug. 6, 2013 (JP) ................................. 2013-163548
Aug. 6, 2013 (JP) ................................. 2013-163549

(51) Int. Cl.
| | |
|---|---|
| H01M 4/00 | (2006.01) |
| H01M 4/62 | (2006.01) |
| C08G 18/44 | (2006.01) |
| C09D 175/04 | (2006.01) |
| C08G 18/62 | (2006.01) |
| C08G 18/69 | (2006.01) |
| C08G 18/72 | (2006.01) |
| C08G 18/73 | (2006.01) |
| C08G 18/75 | (2006.01) |
| C08G 18/08 | (2006.01) |
| C08G 18/32 | (2006.01) |
| C08G 18/34 | (2006.01) |
| H01M 10/0525 | (2010.01) |
| C09D 175/06 | (2006.01) |
| H01M 10/052 | (2010.01) |
| H01M 4/13 | (2010.01) |
| C09J 175/14 | (2006.01) |
| C08L 75/14 | (2006.01) |

(52) U.S. Cl.
CPC ........ *H01M 4/622* (2013.01); *C08G 18/0823* (2013.01); *C08G 18/3206* (2013.01); *C08G 18/348* (2013.01); *C08G 18/44* (2013.01); *C08G 18/62* (2013.01); *C08G 18/6204* (2013.01); *C08G 18/6208* (2013.01); *C08G 18/69* (2013.01); *C08G 18/722* (2013.01); *C08G 18/73* (2013.01); *C08G 18/758* (2013.01); *C09D 175/04* (2013.01); *H01M 10/0525* (2013.01); *C08L 75/14* (2013.01); *C09D 175/06* (2013.01); *C09J 175/14* (2013.01); *H01M 4/13* (2013.01); *H01M 10/052* (2013.01)

(58) Field of Classification Search
CPC ........... C08G 18/6204; C08G 18/6208; H01M 4/622; H01M 4/13; C09J 175/14; C08L 75/14

See application file for complete search history.

(56) References Cited

U.S. PATENT DOCUMENTS

| 5,043,381 A | 8/1991 | Coogan |
| 2004/0077779 A1* | 4/2004 | Schafheutle ....... C08G 18/0823 524/589 |
| 2010/0222448 A1 | 9/2010 | Ziegler |
| 2012/0082853 A1 | 4/2012 | Maeda |

FOREIGN PATENT DOCUMENTS

| JP | H05-021068 | 1/1993 |
| JP | H11-007948 | 1/1999 |
| JP | 2001-210318 | 8/2001 |
| JP | 2012-204010 | 10/2012 |
| WO | 2013/114849 | 1/2013 |

OTHER PUBLICATIONS

International Search Report dated Oct. 21, 2014 in PCT/JP2014/004074 with English translation.
Written Opinion dated Oct. 21, 2014 in PCT/JP2014/004074 with English translation.

* cited by examiner

*Primary Examiner* — Michael L Leonard
(74) *Attorney, Agent, or Firm* — Wenderoth, Lind & Ponack, L.L.P.

(57) ABSTRACT

A binder for an electrode of a lithium secondary battery contains a water dispersion of a polyurethane. The polyurethane has been formed of (A) a polyisocyanate, (B) a compound having two or more active hydrogen groups, (C) a compound having one or more active hydrogen groups and a hydrophilic group, and (D) a chain extending agent. The (B) compound having two or more active hydrogen groups contains an olefinic polyol and/or a carbonate diol having a carbon number between carbonate bond chains of less than 6. The binder has high adhesiveness to a collector, does not cause release in press molding, has high flexibility, and is excellent in bindability and resistance to an electrolytic solution.

5 Claims, No Drawings

BINDER FOR ELECTRODE IN LITHIUM SECONDARY CELL, ELECTRODE MANUFACTURED USING SAID BINDER, AND LITHIUM SECONDARY CELL IN WHICH SAID ELECTRODE IS USED

TECHNICAL FIELD

The present invention relates to a binder for an electrode of a lithium secondary battery, an electrode produced by using the binder, and a lithium secondary battery in which the electrode is used.

BACKGROUND ART

Recently, portable electronic devices such as a mobile phone, a notebook personal computer, a personal digital assistant (PDA), a video camera, and a digital camera are widely spread. With further requirements in size reduction and weight reduction of such electronic devices, the requirements in size reduction, weight reduction, thickness reduction, and increase of capacity of a battery as a driving power supply are rising, and investigations relating to these problems are actively proceeding. A lithium secondary battery has high voltage and a favorable energy density. For this reason, it has been widely used as a power supply of the portable electronic devices. However, with the requirement of further small-sized and weight-reduced battery along with the development of small-sized and weight-reduced display industries, further improved battery characteristics such as high drive voltage, prolonged life and high energy density as compared with a conventional lithium secondary battery are required. Furthermore, recently, the development of a medium-sized or large-sized lithium secondary battery for automobile use or for industries is proceeding, and expectation is placed on the development in the improvement of high capacity and high output. Therefore, to satisfy those requirements, efforts for improving the performance of various constituent elements of the lithium battery has been continued.

Characteristics of a battery are greatly influenced by an electrode, an electrolyte and other battery materials used. Particularly, in the case of an electrode, the characteristics are determined by an electrode active material, a current collector and a binder imparting adhesive force therebetween. For example, an amount and kind of the active material used determine an amount of lithium ions that can be bonded to the active material. Therefore, a higher capacity battery can be obtained as the amount of the active material is large and the active material having larger inherent capacity is used. Furthermore, in the case where the binder has an excellent adhesive force between the active materials and between the active material and the current collector, electrons and lithium ions smoothly transfer inside of the electrode, and internal resistance of the electrode is decreased. As a result, highly efficient charge and discharge can be realized.

In the case of a high capacity battery, a composite electrode such as carbon and graphite or carbon and silicon is required as an anode active material, and volume expansion and contraction of the active material greatly occur during charging and discharging. Therefore, the binder must have excellent elasticity in addition to excellent adhesive force, and must maintain the inherent adhesive force and restoring force despite that the electrode volume repeatedly undergoes considerable expansion and contraction.

As a binder for obtaining such the electrode, known is one containing a fluorine resin such as polytetrafluoroethylene or polyvinylidene fluoride, dissolved in an organic solvent. However, the fluorine resin does not have sufficiently high adhesiveness to a metal constituting the current collector, and additionally, does not have sufficiently high flexibility. Therefore, particularly, in the case of producing a wound-type battery, there are problems that cracks are generated in an electrode layer obtained and peeling occurs between the electrode layer obtained and a current collector. To maintain sufficient adhesive force, the used amount of the resin must be increased, and therefore size reduction has its limit. Furthermore, the resin is used as a mixture with an organic solvent, and therefore there is a disadvantage that the production becomes complicated.

On the other hand, a binder containing a styrene-butadiene latex (SBR) is known as one having high adhesiveness to a metal constituting a current collector and capable of forming an electrode layer having high flexibility (Patent Documents 1, 2 and 3). However, it has excellent elastic property, but adhesive force is weak, the structure of an electrode cannot be maintained with repetition of charging and discharging, and it cannot be said that a life of the battery is sufficient.

In recent years, in view of the demand for enhancement of the battery capacity, there is a tendency that the content of a binder component as a material constituting the electrode layer is decreased, and the electrode layer is subjected to press molding in the production process of the electrode. In the electrode layer that has a small content of the binder component, however, the electrode layer is liable to be released from the collector during the press molding. Therefore, problems are pointed out not only that contamination of the press molding machine with the electrode substance occurs but also that the electrode is installed in a battery in such a state that an electrode layer is partially released off and thus the reliability of the battery performance is deteriorated. Since such problems may become conspicuous when a polymer having a low glass transition temperature and high tackiness is used as the binder component, those may be suppressed by using a latex of which a polymer has a high glass transition temperature, for example, equal to or higher than room temperature. However, in the case of using a binder of which a polymer has a high glass transition temperature, the resulting electrode layer has low flexibility and thus is liable to suffer cracking, so that there arises problems that the capacity retention rate of the battery is deteriorated and sufficient charge and discharge cycle characteristics are not obtained.

BACKGROUND ART DOCUMENTS

Patent Documents

Patent Document 1: JP-A-5-21068
Patent Document 2: JP-A-11-7948
Patent Document 3: JP-A-2001-210318

SUMMARY OF THE INVENTION

Problems that the Invention is to Solve

The present invention has been made under the above circumstances, and an object thereof is to provide a binder that has high adhesiveness to a collector, does not cause release in press molding, has high flexibility, and is excellent in bindability and resistance to an electrolytic solution, and a lithium secondary battery excellent in charge and discharge characteristics in which an electrode produced by using the binder is used.

Means for Solving the Problems

In order to achieve the object, the present inventors have conducted extensive studies for obtaining a binder that has high adhesiveness to a collector, does not cause release in press molding, has high flexibility, and is excellent in bindability and resistance to an electrolytic solution. As a result, they have found that, in a binder for an electrode of a lithium secondary battery, containing a water dispersion of a polyurethane formed of (A) a polyisocyanate, (B) a compound having two or more active hydrogen groups, (C) a compound having one or more active hydrogen groups and a hydrophilic group, and (D) a chain extending agent, the above problems can be solved by the use of a specific compound as the above (B) component. Thus, they have accomplished the present invention.

Namely, the binder for an electrode of a lithium secondary battery of the present invention is a binder for an electrode of a lithium secondary battery, containing a water dispersion of a polyurethane formed of (A) a polyisocyanate, (B) a compound having two or more active hydrogen groups, (C) a compound having one or more active hydrogen groups and a hydrophilic group, and (D) a chain extending agent, in which the (B) compound having two or more active hydrogen groups contains an olefinic polyol and/or a polycarbonate diol having a carbon number between carbonate bond chains of less than 6.

The olefinic polyol contained as the (B) component is preferably contained in a ratio of 40% by mass or more and 90% by mass or less with respect to the polyurethane. Moreover, the polycarbonate diol having a carbon number between carbonate bond chains of less than 6, contained as the (B) component, is preferably contained in a ratio of 50% by mass or more and 90% by mass or less with respect to the polyurethane.

The polyurethane preferably has a crosslinking density of 0.01 or more and 0.50 or less per 1,000 molecular weight of the polyurethane. Moreover, the polyurethane preferably has a urethane bond equivalent of 200 g/eq or more and 2,000 g/eq or less.

The olefinic polyol contained as the (B) component may be one kind or two or more kinds selected from polybutadiene polyol, polyisoprene polyol, hydrogenated polybutadiene polyol, and hydrogenated polyisoprene polyol. The (C) compound having one or more active hydrogen groups and a hydrophilic group preferably contains a carboxyl group as the hydrophilic group. The above (A) polyisocyanate preferably contains an alicyclic isocyanate and/or an aromatic isocyanate.

The electrode of the present invention is produced by using the binder for an electrode of a lithium secondary battery and the lithium secondary battery of the present invention has the electrode of the present invention.

Advantage of the Invention

The binder for an electrode of a lithium secondary battery of the present invention has high adhesiveness to a collector, does not cause release in press molding, has high flexibility, and is excellent in bindability, and becomes also excellent in resistance to an electrolytic solution in the case where the (B) component is an olefinic polyol. A lithium secondary battery that is excellent in charge and discharge characteristics can be obtained by using an electrode in which the binder is used.

MODES FOR CARRYING OUT THE INVENTION

The following will explain embodiments of the present invention in detail.

The binder for an electrode of a lithium secondary battery of the present invention is a binder for an electrode of a lithium secondary battery, containing a water dispersion of a polyurethane formed of (A) a polyisocyanate, (B) a compound having two or more active hydrogen groups, (C) a compound having one or more active hydrogen groups and a hydrophilic group, and (D) a chain extending agent, in which the (B) compound having two or more active hydrogen groups contains an olefinic polyol and/or a polycarbonate diol having a carbon number between carbonate bond chains of less than 6.

The polyisocyanate as the (A) component is not particularly limited, and polyisocyanates that are ordinarily used in this field of art can be used. Specifically, there may be mentioned aliphatic polyisocyanates, alicyclic polyisocyanates, aromatic polyisocyanates, and aromatic aliphatic polyisocyanates. As the aliphatic polyisocyanates, there may be mentioned tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, and the like. As the alicyclic polyisocyanates, there may be mentioned isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane, and the like. As the aromatic polyisocyanates, there may be mentioned tolylene diisocyanate, 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate, and the like. As the aromatic aliphatic polyisocyanates, there may be mentioned a dialkyldiphenylmethane diisocyanate, a tetraalkyldiphenylmethane diisocyanate, α,α,α,α-tetramethylxylylene diisocyanate, and the like. There may also be mentioned a dimer, a trimer, or a modified product such as a biuret-modified isocyanate of these organic polyisocyanates. These may be used solely or as a combination of two or more kinds thereof.

Among these polyisocyanates, an alicyclic isocyanate and/or an aromatic isocyanate are preferred from the standpoint of the bindability and the resistance to an electrolytic solution, and specifically, 4,4'-dicyclohexylmethane diisocyanate, isophorone diisocyanate and 1,3-bis(isocyanatomethyl)cyclohexane are preferred. As the polyisocyanate to be used in combination with the preferable alicyclic and/or aromatic isocyanate, an aliphatic hexamethylene diisocyanate is preferred from the standpoint of flexibility.

As the olefinic polyol to be used as the (B) component, there may be mentioned polyols such as polybutadiene polyol, polyisoprene polyol and polychloroprene polyol and hydrogenated polyols thereof, polyols obtained by copolymerizing a polybutadiene-based polyol with an olefinic compound such as styrene, ethylene, vinyl acetate, or an acrylate ester and hydrogenated polyols thereof, and the like. In particular, polybutadiene polyol, polyisoprene polyol, hydrogenated polybutadiene polyol, and hydrogenated polyisoprene polyol are preferred. These may be used solely or as a combination of two or more kinds thereof.

The content of the olefinic polyol as the (B) component is preferably 40% by mass or more and 90% by mass or less with respect to the polyurethane in the polyurethane water dispersion. When the content falls within the range, the bindability and the resistance to an electrolytic solution are particularly excellent.

As the (B) component in the present invention, other than the olefinic polyol, there can be also used a polycarbonate diol having a carbon number between carbonate bond chains of less than 6. When the carbon number between carbonate bond chains is less than 6, the affinity to the electrolytic solution becomes satisfactory and ion conductivity is improved.

The polycarbonate diol can be obtained by transesterification of a carbonate ester with a diol and removal of the formed alcohol by means of distillation or the like.

As the diol, there may be mentioned linear, cyclic or branched aliphatic diols having a carbon number of 2 to 5. More specifically, there may be mentioned 1,3-butanediol, 1,3-propanediol, 1,4-butanediol, 2,3-butanediol, ethylene glycol, diethylene glycol, propylene glycol, dipropylene glycol, 1,5-pentanediol, neopentyl glycol (hereinafter abbreviated as NPG), 2-methyl-1,3-propanediol, 2,2-methyl-1,3-propanediol, 2-ethyl-1,3-propanediol, 2,2-diethyl-1,3-propanediol, and the like. The diols may be used solely or as a combination of two or more kinds thereof.

Examples of the carbonate ester include alkylene carbonates, dialkyl carbonates and diaryl carbonates. As the alkylene carbonates, there may be mentioned ethylene carbonate, trimethylene carbonate, 1,2-propylene carbonate, 1,2-butylene carbonate, 1,3-butylene carbonate, 1,2-pentylene carbonate, and the like. Moreover, as the dialkyl carbonates, there may be mentioned dimethyl carbonate, diethyl carbonate, di-n-butyl carbonate, and the like. As the diaryl carbonates, there may be mentioned diphenyl carbonate and the like. Among them, the use of ethylene carbonate, dimethyl carbonate, diethyl carbonate, or di-n-butyl carbonate is preferred.

The catalyst to be used in the transesterification reaction of the carbonate ester with the aliphatic diol is not particularly limited but, as a suitable catalyst, there may be mentioned a hydroxide of an alkali metal or an alkaline earth metal, such as sodium hydroxide or potassium hydroxide, a metal alcoholate such as sodium methylate, potassium methylate, titanium tetraisopropylate, or zirconium tetraisopropylate, a titanium compound such as tetraisopropoxytitanium or tetra-n-butoxytitanium, a metal salt of acetic acid, such as magnesium acetate, calcium acetate, zinc acetate, or lead acetate, and the like.

The above-obtained polycarbonate diols of the above (B) may be used solely or as a combination of two or more kinds thereof.

The content of the polycarbonate diol as the (B) component is preferably 50% by mass or more and 90% by mass or less with respect to the polyurethane in the polyurethane water dispersion. When the content is 50% by mass or more, the bindability is particularly excellent, and when it is 90% by mass or less, the resistance to an electrolytic solution is particularly excellent.

The molecular weight of the (B) component is preferably 500 or more and 5,000 or less in terms of number-average molecular weight. When the number-average molecular weight falls within the range, the bindability is particularly excellent, and in the case where the (B) component is an olefinic polyol, the resistance to an electrolytic solution is also particularly excellent.

As the (B) compound having two or more active hydrogen groups, in addition to the above-described ones, for example, a polyether, a polyester, a polyether ester, a polycarbonate, a polythioether, a polyacetal, an acrylic, a polysiloxane, a fluorine-based, or a vegetable oil-based compound or the like may be used in combination. More specifically, there may be mentioned polyhydric alcohols such as ethylene glycol, propylene glycol, propanediol, butanediol, pentanediol, 3-methyl-1,5-pentanediol, hexanediol, neopentyl glycol, diethylene glycol, triethylene glycol, tetraethylene glycol, polyethylene glycol, dipropylene glycol, tripropylene glycol, 1,4-cyclohexanedimethanol, bisphenol A, bisphenol F, bisphenol S, hydrogenated bisphenol A, dibromobisphenol A, dihydroxyethyl terephthalate, hydroquinone dihydroxyethyl ether, trimethylolpropane, glycerin, and pentaerythritol, oxyalkylene derivatives thereof, ester compounds of the polyhydric alcohols or the oxyalkylene derivatives thereof with polybasic carboxylic acids, polybasic carboxylic acid anhydrides or polybasic carboxylic acid esters, and polyol compounds such as a polycarbonate polyol, a polycaprolactone polyol, a polyester polyol, a polthioether polyol, a polyacetal polyol, a polytetramethylene glycol, a fluorine polyol, a silicon polyol, an acryl polyol, a dimer acid-based polyol, a castor oil-based polyol, and a soybean oil-based polyol, and modified products thereof. As the alkylene oxide, there may be mentioned ethylene oxide, propylene oxide, butylene oxide, and the like. The compounds having two or more active hydrogen groups may be used solely or as a combination of two or more kinds thereof. Among them, the combined used of a polycarbonate polyol, a castor oil-based polyol, or a dimer acid-based polyol is preferred. The number-average molecular weight of the compound to be used in combination is preferably 500 or more and 5,000 or less.

The (C) component to be used in the present invention is a compound having one or more active hydrogen groups and a hydrophilic group. As the hydrophilic group, there may be mentioned an anionic hydrophilic group, a cationic hydrophilic group and a nonionic hydrophilic group. Specifically, as the anionic hydrophilic group, there may be mentioned a carboxyl group and a salt thereof and a sulfonic acid group and a salt thereof, as the cationic hydrophilic group, there may be mentioned a tertiary ammonium salt and a quaternary ammonium salt, and as the nonionic hydrophilic group, there may be mentioned a group composed of a repeating unit of ethylene oxide, a group composed of a repeating unit of ethylene oxide and a repeating unit of another alkylene oxide, and the like.

Examples of the compound having one or more active hydrogen groups and a carboxyl group include carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, derivatives thereof, and salts thereof, and also include polyester polyols obtained by using them. Furthermore, there may be mentioned amino acids such as alanine, aminobutyric acid, aminocaproic acid, glycine, glutamic acid, aspartic acid, and histidine, and carboxylic acids such as succinic acid, adipic acid, maleic anhydride, phthalic acid, and trimellitic anhydride.

Examples of the compound having one or more active hydrogen groups and a sulfonic acid group or a salt thereof include sulfonic acid-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid and 2,4-diaminotoluene-5-sulfonic acid and derivatives thereof, and polyester polyols, polyamide polyols and polyamide polyester polyols, which are obtained through copolymerization of those compounds.

The polyurethane finally obtained can be made water-dispersible by neutralizing the carboxyl group or the sulfonic acid group to form a salt. Examples of the neutralizing agent in this case include nonvolatile bases such as sodium hydroxide and potassium hydroxide, and volatile bases such as tertiary amines such as trimethylamine, triethylamine, dimethylethanolamine, methyldiethanolamine, and triethanolamine, and ammonia. The neutralization may be performed either before the urethanization reaction, during the reaction, or after the reaction.

As the compound having one or more active hydrogen groups and a tertiary ammonium salt, there may be mentioned alkanolamines such as methylaminoethanol and methyldiethanolamine. The polyurethane can be made water-dispersible by neutralizing those with an organic carboxylic acid such as formic acid or acetic acid or an inorganic acid such as hydrochloric acid or sulfuric acid to form a salt. The neutralization may be performed either before the urethanization reaction, during the reaction, or after the reaction. Among them, a compound obtained through neutralization of methyldiethanolamine with an organic carboxylic acid is preferred from the standpoint of the easiness of emulsification of the polyurethane.

The compound having one or more active hydrogen groups and a quaternary ammonium salt is a compound obtained through quaternerization of the aforementioned alkanolamine such as methylaminoethanol or methyldiethanolamine with an alkyl halide such as methyl chloride or methyl bromide, or with a dialkyl sulfate such as dimethyl sulfate. Among them, a compound obtained through quaternerization of methyldiethanolamine with dimethyl sulfate is preferred from the standpoint of the easiness of emulsification of the polyurethane.

The compound having one or more active hydrogen groups and a nonionic hydrophilic group is not particularly limited, and a compound that contains at least 30% by mass or more of a repeating unit of ethylene oxide and has a number-average molecular weight of 300 to 20,000 is preferred. Examples thereof include nonionic group-containing compounds such as a polyoxyethylene glycol, a polyoxyethylene-polyoxypropylene copolymer glycol, a polyoxyethylene-polyoxybutylene copolymer glycol, a polyoxyethylene-polyoxyalkylene copolymer glycol, and monoalkyl ethers thereof; and polyester polyether polyols obtained through copolymerization thereof.

As the (C) component, the above-described compounds may be used solely or as a combination of two or more kinds thereof.

With regard to the content of the (C) component, in the case of the anionic hydrophilic group-containing compound, an acid value indicating the content of the anionic hydrophilic group is preferably from 5 to 50 mgKOH/g and more preferably from 5 to 45 mgKOH/g. When the acid value is 5 mgKOH/g or more, the dispersibility in water is particularly satisfactory. When the acid value is 50 mgKOH/g or less, the resistance to an electrolytic solution is particularly excellent. The acid value can be determined from the amount of KOH (mg) that is required for neutralizing the free carboxyl group contained in 1 g of solid content of the polyurethane water dispersion in accordance with JIS K0070-1992. In the case where the nonionic group-containing compound is used, the amount thereof used is preferably from 1 to 30% by mass, and particularly preferably from 5 to 20% by mass. Among them, the (C) component is preferably a compound having one or more active hydrogen groups and a carboxyl group in a molecule from the standpoint of the adhesiveness to a collector.

As the (D) component, use can be made of a chain extending agent that is ordinarily used in this field of art. It is not particularly limited and, specifically, diamines or polyamines can be used. Examples of the diamines include ethylenediamine, trimethylenediamine, piperazine, and isophoronediamine, and examples of the polyamines include diethylenetriamine, dipropylenetriamine and triethylenetetramine.

The number-average molecular weight of the polyurethane to be contained in the binder of the present invention is preferably made as large as possible by introducing a branched structure or an internal crosslinked structure, and is preferably 50,000 or more. When the molecular weight is increased to make the polyurethane insoluble in a solvent, it becomes easy to obtain a coated film that is excellent in the resistance to an electrolytic solution.

The production method of the polyurethane water dispersion of the present invention is not particularly limited but, for example, the following method is used. The (A) polyisocyanate in an amount that is stoichiometrically excessive to the total amount of the active hydrogen groups that are contained in the (B) compound having two or more active hydrogen groups, the (C) compound having one or more active hydrogen groups and a hydrophilic groups and the (D) chain extending agent and that have reactivity with the isocyanate group (the equivalent ratio of the isocyanate group to the active functional group is 1:0.85 to 1.1) is subjected to a reaction without a solvent or in an organic solvent having no active hydrogen group to synthesize a urethane prepolymer having an isocyanate terminal. Then, neutralization or quaternerization of the anionic hydrophilic group or the cationic hydrophilic group of the (C) component is performed depending on necessity, followed by dispersion and emulsification in water. Thereafter, the (D) chain extending agent in a smaller equivalent amount to the residual isocyanate group (the equivalent ratio of the isocyanate group to the chain extending agent is 1:0.5 to 0.9) is added thereto, and the isocyanate group in the emulsion micelle and the (D) chain extending agent are subjected to interfacial polymerization to form a urea bond. According to the procedure, the crosslinking density in the emulsion micelle is increased, and a three-dimensional crosslinked structure is formed. The formation of the three-dimensional crosslinked structure provides a coated film exhibiting excellent resistance to an electrolytic solution. Thereafter, the solvent used is removed depending on necessity, and thereby the polyurethane water dispersion can be provided. The chain extension can be also performed with water molecules present in the system at the time of dispersing and emulsifying in water, without the use of the polyamine or the like as the (D) component.

In the synthesis of the urethane prepolymer, such a solvent can be also used that is inactive to an isocyanate group and is capable of dissolving the urethane prepolymer to be formed. As the solvent, there may be mentioned dioxane, methyl ethyl ketone, dimethylformamide, tetrahydrofuran, N-methyl-2-pyrrolidine, toluene, propylene glycol monomethyl ether acetate, and the like. These hydrophilic organic solvents used in the reaction are preferably removed finally.

The average particle diameter of the polyurethane water dispersion to be used in the present invention is preferably in a range of from 0.005 to 0.5 μm from the standpoint of the amount to be added, the coating property and the bindability.

The polyurethane to be used in the present invention preferably has a crosslinking density of from 0.01 to 0.50 per 1,000 molecular weight of the polyurethane resin. When the crosslinking density is 0.01 or more, the resistance to an electrolytic solution and the heat resistance are particularly excellent, and when it is 0.50 or less, flexibility of the urethane resin is obtained, and bindability becomes particularly excellent.

The crosslinking density referred herein can be obtained by calculation according to an expression represented by the following Mathematical Expression 1. Specifically, the crosslinking density per 1,000 molecular weight of polyurethane can be determined by a calculation according to the following Mathematical Expression 1, where the polyurethane has been obtained through reaction of $W_{A1}$ g of the polyisocyanate (A) having a molecular weight of $MW_{A1}$ and a functional group number of $F_{A1}$, $W_{A2}$ g of the polyisocyanate (A) having a molecular weight of $MW_{A2}$ and a functional group number of $F_{A2}$, $W_{Aj}$ g of the polyisocyanate (A) having a molecular weight of $MW_{Aj}$ and a functional group number of $F_{Aj}$ (j represents an integer of 1 or more), $W_{B1}$ g of the active hydrogen group-containing compound (B) having a molecular weight of $MW_{B1}$ and a functional group number of $F_{B1}$, $W_{B2}$ g of the active hydrogen group-containing compound (B) having a molecular weight of $MW_{B2}$ and a functional group number of $F_{B2}$, $W_{Bk}$ g of the active hydrogen group-containing compound (B) having a molecular weight of $MW_{Bk}$ and a functional group number of $F_{Bk}$ (k represents an integer of 1 or more). $W_{C1}$ g of the compound (C) having one or more active hydrogen groups and a hydrophilic group, which has a molecular weight of $MW_{C1}$ and a functional group number of $F_{C1}$, $W_{Cm}$ g of the compound (C) having one or more active hydrogen groups and a hydrophilic group, which has a molecular weight of $MW_{Cm}$ and a functional group number of $F_{Cm}$ (m represents an integer of 1 or more), $W_{D1}$ g of the chain extending agent (D) having a molecular weight of $MW_{D1}$ and a functional group number of $F_{D1}$, and $W_{Dn}$ g of the chain extending agent (D) having a molecular weight of $MW_{Dn}$ and a functional group number of $F_{Dn}$ (n represents an integer of 1 or more).

[Math. 1]

$$\text{Crosslinking density} = \left[ \frac{\{W_{A1}(F_{A1}-2)/MW_{A1}\} + \{W_{A2}(F_{A2}-2)/MW_{A2}\} + \ldots + \{W_{Aj}(F_{Aj}-2)/MW_{Aj}\}}{(W_{A1}+W_{A2}+\ldots+W_{Aj})+(W_{B1}+W_{B2}+\ldots+W_{Bk})+(W_{C1}+\ldots+W_{Cm})+(W_{D1}+\ldots+W_{Dn})} + \right.$$
$$\frac{\{W_{B1}(F_{B1}-2)/MW_{B1}\} + \{W_{B2}(F_{B2}-2)/MW_{B2}\} + \ldots + \{W_{Bk}(F_{Bk}-2)/MW_{Bk}\}}{(W_{A1}+W_{A2}+\ldots+W_{Aj})+(W_{B1}+W_{B2}+\ldots+W_{Bk})+(W_{C1}+\ldots+W_{Cm})+(W_{D1}+\ldots+W_{Dn})} +$$
$$\frac{\{W_{C1}(F_{C1}-2)/MW_{C1}\} + \ldots + \{W_{Cm}(F_{Cm}-2)/MW_{Cm}\}}{(W_{A1}+W_{A2}+\ldots+W_{Aj})+(W_{B1}+W_{B2}+\ldots+W_{Bk})+(W_{C1}+\ldots+W_{Cm})+(W_{D1}+\ldots+W_{Dn})} +$$
$$\left. \frac{\{W_{D1}(F_{D1}-2)/MW_{D1}\} + \ldots + \{W_{Dn}(F_{Dn}-2)/MW_{Dn}\}}{(W_{A1}+W_{A2}+\ldots+W_{Aj})+(W_{B1}+W_{B2}+\ldots+W_{Bk})+(W_{C1}+\ldots+W_{Cm})+(W_{D1}+\ldots+W_{Dn})} \right] \times 1000$$

Mathematical Expression 1

In the case where the (B) compound having two or more active hydrogen groups contains an olefinic polyol, the urea bond equivalent of the polyurethane is preferably from 400 to 10,000 g/eq. When the urea bond equivalent is 400 g/eq or more, the polyurethane is particularly excellent in the flexibility and the bindability, and when it is 10,000 g/eq or less, the workability during synthesis is satisfactory and the resistance to an electrolytic solution and the heat resistance are also particularly excellent.

On the other hand, in the case where the (B) compound having two or more active hydrogen groups contains a polycarbonate diol having a carbon number between carbonate bond chains of less than 6, the urea bond equivalent of the polyurethane is preferably from 300 to 20,000 g/eq, and more preferably from 400 to 10,000 g/eq. When the urea bond equivalent is 300 g/eq or more, the polyurethane is particularly excellent in the flexibility and the bindability, and when it is 20,000 g/eq or less, the workability during synthesis is satisfactory and the resistance to an electrolytic solution and the heat resistance are also excellent.

Here, the urea bond equivalent of the polyurethane is number-average molecular weight per urea bond in one molecule of the polyurethane and can be determined by calculation according to an expression represented by the following Mathematical Expression 2. The letters in the expression mean the same as the letters in the Mathematical Expression 1.

[Math. 2]

$$\text{Urea bond equivalent} = \frac{1}{\left\{ \begin{array}{c} (W_{A1} \times F_{A1}/MW_{A1} + W_{A2} \times F_{A2}/MW_{A2} + \ldots + W_{Aj} \times F_{Aj}/MW_{Aj}) - \\ (W_{B1} \times F_{B1}/MW_{B1} + W_{B2} \times F_{B2}/MW_{B2} + \ldots + W_{Bk} \times F_{Bk}/MW_{Bk}) - \\ (W_{C1} \times F_{C1}/MW_{C1} + \ldots + W_{Cm} \times F_{Cm}/MW_{Cm}) \end{array} \right\}}{\left\{ \begin{array}{c} (W_{A1}+W_{A2}+\ldots+W_{Aj})+(W_{B1}+W_{B2}+\ldots+W_{Bk})+ \\ (W_{C1}+\ldots+W_{Cm})+(W_{D1}+\ldots+W_{Dn}) \end{array} \right\}}$$

Mathematical Expression 2

In the case where the (B) compound having two or more active hydrogen groups contains an olefinic polyol, the polyurethane of the present invention has a urethane bond equivalent of preferably from 300 to 1,500 g/eq. When the urethane bond equivalent is 300 g/eq or more, the polyurethane has sufficient flexibility and is particularly excellent in the resistance to an electrolytic solution and the bonding capability, and when it is 1,500 g/eq or less, it is particularly excellent in the bonding capability.

In the case where the (B) compound having two or more active hydrogen groups contains a polycarbonate diol having a carbon number between carbonate bond chains of less than 6, the polyurethane of the present invention has a urethane bond equivalent of preferably from 200 to 2,000 g/eq, and more preferably from 300 to 1,000 g/eq. When the methane bond equivalent falls within the range, the bonding capability and the resistance to an electrolytic solution are particularly excellent.

Here, the urethane bond equivalent of the polyurethane is number-average molecular weight per urethane bond in one molecule of the polyurethane and can be determined by calculation according to an expression represented by the following Mathematical Expression 3. The letters in the expression mean the same as the letters in the Mathematical Expression 1.

[Math. 3]

$$\text{Urethane bond equivalent} = \frac{1}{(W_{A1} \times F_{A1}/MW_{A1} + W_{A2} \times F_{A2}/MW_{A2} + \ldots + W_{Aj} \times F_{Aj}/MW_{Aj})} - \frac{1}{\text{Urea bond equivalent}}$$
$$\left\{ \frac{(W_{A1} + W_{A2} + \ldots + W_{Aj}) + (W_{B1} + W_{B2} + \ldots + W_{Bk}) +}{(W_{C1} + \ldots + W_{Cm}) + (W_{D1} + \ldots + W_{Dn})} \right\}$$

Mathematical Expression 3

In the case where the (B) component contains a polycarbonate diol, the carbonate bond equivalent of the polyurethane of the present invention is preferably 500 g/eq or less. When it is 500 g/eq or less, the affinity to an electrolytic solution is satisfactory and the charge and discharge characteristics are particularly excellent.

Here, the carbonate bond equivalent of the polyurethane is number-average molecular weight per carbonate bond in one molecule of the polyurethane. Specifically, the carbonate bond equivalent of polyurethane can be determined by calculation according to the following Mathematical Expression 4, in the case where the polyurethane has been obtained through reaction of $W_{A1}$ g of the polyisocyanate (A) having a molecular weight of $MW_{A1}$ and a functional group number of $F_{A1}$, $W_{A2}$ g of the polyisocyanate (A) having a molecular weight of $MW_{A2}$ and a functional group number of $F_{A2}$, $W_{Aj}$ g of the polyisocyanate (A) having a molecular weight of $MW_{Aj}$ and a functional group number of $F_{Aj}$ (j represents an integer of 1 or more), $W_{B1}$ g of the active hydrogen group-containing compound (B) having a molecular weight of $MW_{B1}$ and a functional group number of $F_{B1}$, $W_{B2}$ g of the active hydrogen group-containing compound (B) having a molecular weight of $MW_{B2}$ and a functional group number of $F_{B2}$, $W_{Bk}$ g of the active hydrogen group-containing compound (B) having a molecular weight of $MW_{Bk}$ and a functional group number of $F_{Bk}$ (k represents an integer of 1 or more), $W_{C1}$ g of the compound (C) having one or more active hydrogen groups and a hydrophilic group, which has a molecular weight of $MW_{C1}$ and a functional group number of $F_{C1}$, $W_{Cm}$ g of the compound (C) having one or more active hydrogen groups and a hydrophilic group, which has a molecular weight of $MW_{Cm}$ and a functional group number of $F_{Cm}$ (m represents an integer of 1 or more), $W_{D1}$ g of the chain extending agent (D) having a molecular weight of $MW_{D1}$ and a functional group number of $F_{D1}$, and $W_{Dn}$ g of the chain extending agent (D) having a molecular weight of $MW_{Dn}$ and a functional group number of $F_{Dn}$ (n represents an integer of 1 or more), in which the active hydrogen group-containing compound (B) having a molecular weight of $MW_{B1}$ and a functional group number of $F_{B1}$ is a polycarbonate diol (B) having a molecular weight of $MW_{B1a}$.

[Math. 4]

$$\text{Carbonate bond equivalent} = \frac{(MW_{B1a} + 26)}{\dfrac{(W_{B1})}{\left\{ \dfrac{(W_{A1} + W_{A2} + \ldots + W_{Aj}) + (W_{B1} + W_{B2} + \ldots + W_{Bk}) +}{(W_{C1} + \ldots + W_{Cm}) + (W_{D1} + \ldots + W_{Dn})} \right\}}}$$

Mathematical Expression 4

In the present invention, a crosslinking agent may also be used in production of the polyurethane water dispersion. Examples of the crosslinking agent include aziridine, oxazoline, modified polyisocyanate, and polyepoxide compounds, and these crosslinking agents may be used solely or as a combination of two or more kinds thereof.

A positive electrode and a negative electrode to be used in the lithium secondary battery each are constituted by an electrode active substance, a conductive agent, a binder for binding the electrode active substance and the conductive agent to a collector, and the like. The lithium secondary battery of the present invention is constituted by using an electrode that is produced by using a binder containing the polyurethane water dispersion. The binder may be utilized in both the positive electrode and the negative electrode.

In the lithium secondary battery of the present invention, as the binder for an electrode in which the binder for an electrode, which contains the polyurethane resin water dispersion of the present invention is not used, use can be made of such polymers as polyvinylidene fluoride, a polyvinylidene fluoride copolymer resin such as a copolymer of polyvinylidene fluoride with hexafluoropropylene, perfluoromethyl vinyl ether or tetrafluoroethylene, a fluorine resin such as polytetrafluoroethylene and fluorine rubber, styrene-butadiene rubber, ethylene-propylene rubber, and a styrene-acrylonitrile copolymer without limitation thereto.

The positive electrode active substance to be used in the positive electrode of the lithium secondary battery of the present invention is not particularly limited as far as it can perform insertion and desorption of lithium ions. Examples thereof include metal oxides such as CuO, $Cu_2O$, $MnO_2$, $MoO_3$, $V_2O_5$, $Cr_3O$, $Fe_2O_3$, $Ni_2O_3$, and $CoO_3$, composite oxides of lithium and a transition metal, such as $Li_xCoO_2$, $Li_xNiO_2$, $Li_xMn_2O_4$, and $LiFePO_4$, metal chalcogen compounds such as $TiS_2$, $MoS_2$ and $NbSe_3$, and conductive polymer compounds such as polyacene, poly-para-phenylene, polypyrrole, and polyaniline. Among the above-described ones, composite oxides of one or more kinds selected from transition metals including cobalt, nickel and manganese with lithium, which are generally referred to as a high voltage system, are preferred from the standpoints of releasability of lithium ion and easily obtaining a high voltage. Specific examples of the composite oxides of cobalt, nickel or manganese with lithium include $LiCoO_2$, $LiMnO_2$, $LiMn_2O_4$, $LiNiO_2$, $LiNi_xCo_{(1-x)}O_2$, and $LiMn_aNi_b$-$Co_c$ (a+b+c=1). It is also possible to use a material obtained by doping the lithium composite oxides with a small amount of an element such as fluorine, boron, aluminum, chromium, zirconium, molybdenum, or iron, or the lithium composite oxides whose particle surfaces are subjected to a surface treatment with carbon, MgO, $Al_2O_3$, $SiO_2$, or the like. The positive electrode active substance may be used as a combination of two or more kinds thereof.

As the negative electrode active substance to be used in the negative electrode of the present invention, any known active substance can be used without particular limitation as far as it is capable of performing insertion and desorption of metal lithium or lithium ions. For example, carbon materials such as natural graphite, artificial graphite, hardly graphitizable carbon, and easily graphitizable carbon can be used. Also, a metal material such as metal lithium, an alloy and a tin compound, a lithium transition metal nitride, a crystalline metal oxide, an amorphous metal oxide, a silicon compound, a conductive polymer, and the like can be used, and specific examples thereof include $Li_4Ti_5O_{12}$ and $NiSi_5C_6$.

A conductive agent is used in the positive electrode and the negative electrode of the lithium secondary battery of the present invention. Any electronic conductive material that does not adversely affect the battery performance may be used as the conductive agent without particular limitation. In general, carbon black such as acetylene black and Ketjen black is used, and such conductive materials may be used as natural graphite (e.g., squamate graphite, scaly graphite and earthy graphite), artificial graphite, carbon whiskers, carbon fibers, metal (e.g., copper, nickel, aluminum, silver, and gold) powders, metal fibers, and conductive ceramic materials. These materials may be used as a mixture of two or more kinds thereof. The amount thereof to be added is preferably from 0.1 to 30% by mass, and more preferably from 0.2 to 20% by mass with respect to the active substance.

As the collector for the electrode active substance of the lithium secondary battery of the present invention, any electronic conductive material that does not adversely affect the battery constituted may be used without particular limitation. For example, as the collector for the positive electrode, there can be used aluminum, titanium, stainless steel, nickel, sintered carbon, a conductive polymer, conductive glass, and the like, and also aluminum, copper or the like whose surface is subjected to a treatment with carbon, nickel, titanium, silver, or the like for the purpose of enhancing the adhesion property, the conductivity and the oxidation resistance. As the collector for the negative electrode, there can be used copper, stainless steel, nickel, aluminum, titanium, sintered carbon, a conductive polymer, conductive glass, an Al—Cd alloy, and the like, and also copper or the like whose surface is subjected to a treatment with carbon, nickel, titanium, silver, or the like for the purpose of enhancing the adhesion property, the conductivity and the oxidation resistance. The surface of the material for the collector may be subjected to an oxidation treatment. With regard to the shape thereof, there may be used a foil form, and also a film form, a sheet form, a net form, a punched or expanded member, and a molded body such as a lath body, a porous body and a foamed body. The thickness thereof is not particularly limited, and one having a thickness of from 1 to 100 µm may be generally used.

The electrode of the lithium secondary battery of the present invention may be produced by mixing the electrode active substance, a conductive agent, a collector for the electrode active substance, a binder for binding the electrode active substance and the conductive agent to the collector, and the like to prepare an electrode material in a slurry form, applying the material on an aluminum foil, a copper foil or the like as a collector, and evaporating the dispersion medium.

In the electrode material of the present invention, a thickener such as a water soluble polymer can be used as a viscosity controlling agent for forming the slurry. Specifically, use can be made of one kind or two or more kinds selected from cellulose compounds such as a carboxymethyl cellulose salt, methyl cellulose, ethyl cellulose, hydroxymethyl cellulose, hydroxypropyl methyl cellulose, and hydroxyethyl methyl cellulose; polycarboxylic acid-based compounds such as polyacrylic acid and sodium polyacrylate; compounds having a vinylpyrrolidone structure, such as polyvinylpyrrolidone; polyacrylamide, polyethylene oxide, polyvinyl alcohol, sodium alginate, xanthan gum, carrageenan, guar gum, agar, starch, and the like, and among these, a carboxymethyl cellulose salt is preferred.

The method, the order and the like of mixing the electrode material are not particularly limited. For example, the active substance and the conductive agent may be mixed in advance to be used, and for mixing in this case, a mortar, a mill mixer, a ball mill such as a planetary ball mill or a shaker ball mill, a mechano-fusion, and the like may be used.

As the separator to be used in the lithium secondary battery of the present invention, a separator that is used in an ordinary lithium secondary battery can be used without particular limitation, and examples thereof include porous resins formed of a polyethylene, a polypropylene, a polyolefin, a polytetrafluoroethylene, or the like, ceramics, and nonwoven fabrics.

As the electrolytic solution to be used in the lithium secondary battery of the present invention, an organic electrolytic solution, an ionic liquid, or the like, which is used conventionally in a lithium secondary battery, may be used without particular limitation.

The electrolyte salt to be used in the lithium secondary battery of the present invention is not particularly limited, and examples thereof include $LiPF_6$, $LiBF_4$, $LiClO_4$, $LiAsF_6$, LiCl, LiBr, $LiCF_3SO_3$, $LiN(CF_3SO_2)_2$, $LiC(CF_3SO_2)_3$, LiI, $LiAlCl_4$, $NaClO_4$, $NaBF_4$, and NaI, and particularly include inorganic lithium salts such as $LiPF_6$, $LiBF_4$, $LiClO_4$, and $LiAsF_6$ and an organic lithium salt represented by $LiN(SO_2C_xF_{2x+1})(SO_2C_yF_{2y+1})$. Here, x and y each represent 0 or an integer of from 1 to 4 and x+y is an integer of from 2 to 8. Specifically, as the organic lithium salt, there may be mentioned $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, $LiN(SO_2C_2F_5)(SO_2C_4F_9)$, and the like. Among these, the use of $LiPF_6$, $LiBF_4$, $LiN(CF_3SO_2)_2$, $LiN(SO_2F)_2$, $LiN(SO_2C_2F_5)_2$, or the like for the electrolyte is preferred due to excellent electric characteristics. The electrolyte salts may be used solely or as a combination of two or more kinds thereof. The lithium salt is generally contained in the electrolytic solution in a concentration of from 0.1 to 2.0 mol/L and preferably from 03 to 1.5 mol/L.

The organic solvent for dissolving the electrolyte salt of the lithium secondary battery of the present invention is not particularly limited as far as it is an organic solvent that is used for a non-aqueous electrolytic solution in an ordinary lithium secondary battery, and examples thereof include carbonate compounds, lactone compounds, ether compounds, sulfolane compounds, dioxolane compounds, ketone compounds, nitrile compounds, and halogenated hydrocarbon compounds. Specifically, there may be mentioned carbonates such as dimethyl carbonate, methyl ethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones such as γ-butyrolactone; ethers such as dimethoxyethane, tetrahydrofuran, 2-methyltetrahydrofuran, tetrahydropyran, and 1,4-dioxane; sulfolanes such as sulfolane and 3-methylsulfolane; dioxolanes such as 1,3-dioxolane; ketones such as 4-methyl-2-pentanone; nitriles such as acetonitrile, propionitrile, valeronitrile, and benzonitrile; halogenated hydrocarbons such as 1,2-dichloroethane; ionic liquids of other compounds such as methyl formate, dimethylformamide, diethylformamide, dimethylsulfoxide, an imidazolium salt, and a quaternary ammonium salt; and the like. A mixture of these may be used.

Among the organic solvents, one kind or more of a non-aqueous solvent selected from the group consisting of the carbonates is preferably contained in view of excellent solubility of the electrolyte, dielectric constant and viscosity.

In the case where a polymer electrolyte or a polymer gel electrolyte is used in the lithium secondary battery of the present invention, there may be used a polymer compound such as a polymer of an ether, an ester, a siloxane, acrylonitrile, vinylidene fluoride, hexafluoropropylene, an acrylate, a methacrylate, styrene, vinyl acetate, vinyl chloride, oxetane, or the like, a polymer having a copolymer structure thereof, or a crosslinked material thereof. They may be used solely or as a combination of two or more kinds thereof. Without particular limitation, a polymer having an ether structure, such as polyethylene oxide, is particularly preferred.

In the lithium secondary battery of the present invention, a liquid-type battery contains an electrolytic solution, a gel-type battery contains a precursor solution containing a polymer dissolved in an electrolytic solution, and a solid electrolyte battery contains a pre-crosslinked polymer having an electrolyte salt dissolved therein, each in a battery container.

The lithium secondary battery according to the present invention may be formed to a cylindrical shape, a coin shape, a rectangular shape, or any other arbitrary shape. The basic structure of the battery is the same regardless of the shape, and the design may be changed to be used depending on the purpose. In the case of a cylindrical battery, for example, it can be obtained as follows: a negative electrode composed of a negative electrode collector coated with a negative electrode active substance and a positive electrode composed of a positive electrode collector coated with a positive electrode active substance are wound with a separator intervening therebetween to form a wound assembly, which is then housed in a battery canister, and a non-aqueous electrolytic solution is charged therein, followed by sealing with insulating plates placed on the top and bottom. In the case of application to a coin lithium secondary battery, a disk-shaped negative electrode, a separator, a disk-shaped positive electrode, and stainless steel plates are laminated and housed in a coin battery canister, and a non-aqueous electrolytic solution is charged therein, followed by sealing.

EXAMPLES

Examples will be described along with Comparative Examples below, but the present invention should not be construed as being limited to these Examples.

Synthesis of Polyurethane Water Dispersion (Synthetic Example 1-1) Synthesis of Polyurethane Water Dispersion 1A To a four-neck flask equipped with a stirrer, a reflux condenser, a thermometer, and a nitrogen blowing tube were added 184.1 parts by mass of a polybutadiene polyol (manufactured by Idemitsu Kosan Co., Ltd., PolybdR-15HT, average hydroxyl value: 102.7 mgKOH/g, number of active hydrogen group: 2.30), 15.4 parts by mass of dimethylolpropionic acid (number of active hydrogen group: 2), 100.5 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 2.7% with respect to the non-volatile content. The solution was cooled to 45° C. and neutralized by adding 11.6 parts by mass of triethylamine, and then emulsified and dispersed by using a homogenizer while gradually adding 900 parts by mass of water thereto. Subsequently, an aqueous solution obtained by diluting 5.1 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1A having a nonvolatile content of about 30%.

(Synthetic Example 1-2) Synthesis of Polyurethane Water Dispersion 1B

To a four-neck flask equipped with a stirrer, a reflux condenser, a thermometer, and a nitrogen blowing tube were added 195.0 parts by mass of a polybutadiene polyol (manufactured by Idemitsu Kosan Co., Ltd., PolybdR-15HT, average hydroxyl value: 102.7 mgKOH/g, number of active hydrogen group: 2.30), 12.6 parts by mass of dimethylolpropionic acid (number of active hydrogen group: 2), 92.4 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 2.1% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.6 parts by mass of diethylenetriamine (number of active hydrogen group: 3) with 100 parts by mass of water was added thereto, and chain extending reaction was performed for 1 hour. The solvent was removed while heating at 50° C. under reduced pressure, thereby affording a polyurethane water dispersion 1B having a nonvolatile content of about 30%.

(Synthetic Example 1-3) Synthesis of Polyurethane Water Dispersion 1C

To a four-neck flask equipped with a stirrer, a reflux condenser, a thermometer, and a nitrogen blowing tube were added 215.3 parts by mass of a polybutadiene polyol (manufactured by Idemitsu Kosan Co., Ltd., PolybdR-45HT, average hydroxyl value: 46.5 mgKOH/g, number of active hydrogen group: 2.32), 15.4 parts by mass of dimethylolpropionic acid (number of active hydrogen group: 2), 69.3 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.5% with respect to the nonvolatile content. The solution was cooled to 45° C. and neutralized by adding 11.6 parts by mass of triethylamine, and then emulsified and dispersed by using a homogenizer while gradually adding 900 parts by mass of water thereto. Subsequently, an aqueous solution obtained by diluting 3.0 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1C having a nonvolatile content of about 30%.

(Synthetic Example 1-4) Synthesis of Polyurethane Water Dispersion 1D

To a four-neck flask equipped with a stirrer, a reflux condenser, a thermometer, and a nitrogen blowing tube were added 213.6 parts by mass of a hydrogenated polyisoprene polyol (manufactured by Idemitsu Kosan Co., Ltd., Epol, average hydroxyl value: 50.5 mgKOH/g, number of active hydrogen group: 2.25), 15.4 parts by mass of dimethylolpropionic acid (number of active hydrogen group: 2), 71.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.5% with respect to the nonvolatile content. The solution was cooled to 45° C. and neutralized by adding 11.6 parts by mass of triethylamine, and then emulsified and dispersed by using a homogenizer while gradually adding 900 parts by mass of water thereto. Subsequently, an aqueous solution obtained by diluting 2.9 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1D having a nonvolatile content of about 30%.

(Synthetic Example 1-5) Synthesis of Polyurethane Water Dispersion 1E

To a four-neck flask equipped with a stirrer, a reflux condenser, a thermometer, and a nitrogen blowing tube were added 202.1 parts by mass of a polybutadiene polyol (manufactured by Idemitsu Kosan Co., Ltd., PolybdR-15HT, average hydroxyl value: 102.7 mgKOH/g, number of active hydrogen group: 2.30), 12.6 parts by mass of dimethylolpropionic acid (number of active hydrogen group: 2), 64.56 parts by mass of dicyclohexylmethane diisocyanate, 20.73 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 2.4% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1E having a nonvolatile content of about 30%.

(Synthetic Example 1-6) Synthesis of Polyurethane Water Dispersion 1F

To a four-neck flask equipped with a stirrer, a reflux condenser, a thermometer, and a nitrogen blowing tube were added 206.2 parts by mass of a polybutadiene polyol (manufactured by Idemitsu Kosan Co., Ltd., PolybdR-15HT, average hydroxyl value: 102.7 mgKOH/g, number of active hydrogen group: 2.30), 12.6 parts by mass of dimethylolpropionic acid (number of active hydrogen group: 2), 49.5 parts by mass of dicyclohexylmethane diisocyanate, 31.74 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 2.5% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.8 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1F having a nonvolatile content of about 30%.

(Synthetic Example 1-7) Synthesis of Polyurethane Water Dispersion 1G

To a four-neck flask equipped with a stirrer, a reflux condenser, a thermometer, and a nitrogen blowing tube were added 147.6 parts by mass of a polybutadiene polyol (manufactured by Idemitsu Kosan Co., Ltd., PolybdR-15HT, average hydroxyl value: 102.7 mgKOH/g, number of active hydrogen group: 2.30), 63.27 parts by mass of a polycarbonate polyol containing 1,9-nonanediol and methyloctane diol as constituents in a mass ratio of 65/35 (manufactured by Kuraray Co., Ltd., Kurapol C-2065N, average hydroxyl value: 58.1 mgKOH/g, number of active hydrogen group: 2), 12.6 parts by mass of dimethylolpropionic acid (number of active hydrogen group: 2), 46.62 parts by mass of dicyclohexylmethane diisocyanate, 29.94 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 2.5% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.8 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1O having a nonvolatile content of about 30%.

(Synthetic Example 1-8) Synthesis of Polyurethane Water Dispersion 1H

To a four-neck flask equipped with a stirrer, a reflux condenser, a thermometer, and a nitrogen blowing tube were added 220.4 parts by mass of a polybutadiene polyol (manufactured by Idemitsu Kosan Co., Ltd., PolybdR-45HT, average hydroxyl value: 46.5 mgKOH/g, number of active hydrogen group: 2.32), 12.6 parts by mass of dimethylolpropionic acid (number of active hydrogen group: 2), 67.0 parts by mass of polymeric MDI, and 200 parts by mass of methyl ethyl ketone, and the reaction was carried out at 75° C. for 4 hours to afford a methyl ethyl ketone solution of a urethane prepolymer having a free isocyanate group content of 2.1% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.1 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1H having a nonvolatile content of about 30%.

(Synthetic Example 1-9) Synthesis of Polyurethane Water Dispersion 1I

To a four-neck flask equipped with a stirrer, a reflux condenser, a thermometer, and a nitrogen blowing tube were added 216.0 parts by mass of a polyisoprene polyol (manufactured by Idemitsu Kosan Co., Ltd., Polyip, average hydroxyl value: 46.56 mgKOH/g, number of active hydrogen group: 2.08), 12.6 parts by mass of dimethylolpropionic acid (number of active hydrogen group: 2), 71.40 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 2.3% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.4 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1I having a nonvolatile content of about 30%.

(Synthetic Example 1-10) Synthesis of Polyurethane Water Dispersion 1J

To a four-neck flask equipped with a stirrer, a reflux condenser, a thermometer, and a nitrogen blowing tube were added 172.8 parts by mass of a polybutadiene polyol (manufactured by Idemitsu Kosan Co., Ltd., PolybdR-45HT, average hydroxyl value: 46.5 mgKOH/g, number of active hydrogen group: 2.32), 43.2 parts by mass of a polycarbonate polyol containing 1,9-nonanediol and methyloctane diol as constituents in a mass ratio of 65/35 (manufactured by Kuraray Co., Ltd., Kurapol C-2065N, average hydroxyl value: 58.1 mgKOH/g, number of active hydrogen group: 2), 12.6 parts by mass of dimethylolpropionic acid (number of active hydrogen group: 2), 71.40 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 2.2% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.1 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1J having a nonvolatile content of about 30%.

(Synthetic Example 1-11) Synthesis of Polyurethane Water Dispersion 1K

To a four-neck flask equipped with a stirrer, a reflux condenser, a thermometer, and a nitrogen blowing tube were added 180.0 parts by mass of a polybutadiene polyol (manufactured by Idemitsu Kosan Co., Ltd., PolybdR-15HT average hydroxyl value: 102.7 mgKOH/g, number of active hydrogen group: 2.30), 13.0 parts by mass of dimethylolpropionic acid (number of active hydrogen group: 2), 107.00 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 4.0% with respect to the nonvolatile content. The solution was cooled to 45° C. and neutralized by adding 8.8 parts by mass of triethylamine, and then emulsified and dispersed by using a homogenizer while gradually adding 900 parts by mass of water thereto. Subsequently, an aqueous solution obtained by diluting 8.5 parts by mass of diethylenetriamine (number of active hydrogen group: 3) with 100 parts by mass of water was added thereto, and chain extending reaction was performed for 1 hour. The solvent was removed while heating at 50° C. under reduced pressure, thereby affording a polyurethane water dispersion 1K having a nonvolatile content of about 30%.

(Synthetic Example 1-12) Synthesis of Polyurethane Water Dispersion 1L

To a four-neck flask equipped with a stirrer, a reflux condenser, a thermometer, and a nitrogen blowing tube were added 222.4 parts by mass of a polytetramethylene ether glycol (manufactured by BASF, PolyTHF 1000, average hydroxyl value: 110 mgKOH/g, number of active hydrogen group: 2), 12.6 parts by mass of dimethylolpropionic acid (number of active hydrogen group: 2), 65.0 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 1.8% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 3.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1L having a nonvolatile content of about 30%.

(Synthetic Example 1-13) Synthesis of Polyurethane Water Dispersion 1M

To a four-neck flask equipped with a stirrer, a reflux condenser, a thermometer, and a nitrogen blowing tube were added 220.0 parts by mass of a polytetramethylene ether glycol (manufactured by BASF, PolyTHF 1000, average hydroxyl value: 110 mgKOH/g, number of active hydrogen group: 2), 0.30 parts by mass of trimethylolpropane (number of active hydrogen group: 3), 12.6 parts by mass of dimethylolpropionic acid (number of active hydrogen group: 2), 67.1 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 2.1% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 4.1 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 1M having a nonvolatile content of about 30%.

(Synthetic Example 1-14) Synthesis of Polyurethane Water Dispersion 1N

To a four-neck flask equipped with a stirrer, a reflux condenser, a thermometer, and a nitrogen blowing tube were added 182.8 parts by mass of a polytetramethylene ether glycol (manufactured by BASF, PolyTHF 1000, average hydroxyl value: 110 mgKOH/g, number of active hydrogen group: 2), 12.70 parts by mass of trimethylolpropane (number of active hydrogen group: 3), 12.6 parts by mass of dimethylolpropionic acid (number of active hydrogen group: 2), 91.90 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 3.4% with respect to the nonvolatile content. The solution was cooled to 45° C. and neutralized by adding 9.5 parts by mass of triethylamine, and then emulsified and dispersed by using a homogenizer while gradually adding 900 parts by mass of water thereto. Subsequently, an aqueous solution obtained by diluting 7.6 parts by mass of diethylenetriamine (number of active hydrogen group: 3) with 100 parts by mass of water was added thereto, and chain extending reaction was performed for 1 hour. The solvent was removed while heating at 50° C. under reduced pressure, thereby affording a polyurethane water dispersion 1N having a nonvolatile content of about 30%.

(Synthetic Example 1-15) Synthesis of Polyurethane Water Dispersion 1O

To a four-neck flask equipped with a stirrer, a reflux condenser, a thermometer, and a nitrogen blowing tube were added 117.0 parts by mass of a polybutadiene polyol (manufactured by Idemitsu Kosan Co., Ltd., PolybdR-15HT, average hydroxyl value: 102.7 mgKOH/g, number of active hydrogen group: 2.30), 40.0 parts by mass of 1,4-butanediol (number of active hydrogen group: 2), 15.0 parts by mass of dimethylolpropionic acid (number of active hydrogen group: 2), 128.0 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 2.6% with respect to the nonvolatile content. Then, 1.3 parts by mass of monoethylamine was added to the solution to carry out the reaction, and then cooled to 45° C. and neutralized by adding 11.3 parts by mass of triethylamine. Thereafter, the solution was emulsified and dispersed by using a homogenizer while gradually adding 900 parts by mass of water thereto. The solvent was removed while heating at 50° C. under reduced pressure, thereby affording a polyurethane water dispersion 1O having a nonvolatile content of about 30%.

[Evaluation of Polyurethane Water Dispersion]

Upon individual measurements for the polyurethane water dispersions obtained, the following methods were used. The results are shown in Table 1 below.

Weight of the nonvolatile content of the polyurethane water dispersion: Measured in accordance with JIS K 6828.

Crosslinking density in the resin solid content of the polyurethane water dispersion: Calculated according to the above-described Mathematical Expression 1.

Acid value of the polyurethane resin: Measured in accordance with JIS K 0070-1992.

Urea bond equivalent and urethane bond equivalent: Calculated according to the above-described Mathematical Expression 2 and Mathematical Expression 3, respectively.

Measurement of average particle diameter of the polyurethane water dispersion: The average particle diameter was measured with Microtrac UPA-UZ152 (manufactured by Nikkiso Co., Ltd.), and a 50% average value was calculated as the average particle diameter.

TABLE 1

| Polyurethane water dispersion | Crosslinking density | Average particle diameter (μm) | Acid value (mgKOH/g) | Urethane bond equivalent (g/eq) | Urea bond equivalent (g/eq) | Content of olefinic polyol of B component (wt %) |
|---|---|---|---|---|---|---|
| 1A | 0.15 | 0.03 | 21 | 529 | 1607 | 60 |
| 1B | 0.30 | 0.09 | 17 | 548 | 2039 | 64 |
| 1C | 0.08 | 0.20 | 21 | 720 | 2798 | 71 |
| 1D | 0.07 | 0.05 | 21 | 697 | 2812 | 71 |
| 1E | 0.16 | 0.10 | 17 | 535 | 1793 | 66 |
| 1F | 0.16 | 0.03 | 17 | 528 | 1710 | 68 |
| 1G | 0.12 | 0.02 | 17 | 571 | 1708 | 48 |
| 1H | 0.08 | 0.12 | 17 | 794 | 2000 | 72 |
| 1I | 0.02 | 0.10 | 17 | 802 | 1842 | 71 |
| 1J | 0.07 | 0.13 | 17 | 786 | 1920 | 57 |
| 1K | 0.41 | 0.23 | 18 | 578 | 1089 | 58 |
| 1L | 0 | 0.02 | 17 | 470 | 2381 | 0 |
| 1M | 0.007 | 0.02 | 17 | 470 | 2015 | 0 |
| 1N | 0.57 | 0.03 | 17 | 362 | 1259 | 0 |
| 1O | 0 | 0.10 | 21 | 225 | 1600 | 38 |

[Production of Electrodes]

The binders used for production of electrodes are shown in Table 2 below.

TABLE 2

| Kind of electrode | Kind of binder |
|---|---|
| Negative electrode 1-1 | Polyurethane water dispersion 1A |
| Negative electrode 1-2 | Polyurethane water dispersion 1B |
| Negative electrode 1-3 | Polyurethane water dispersion 1C |
| Negative electrode 1-4 | Polyurethane water dispersion 1D |
| Negative electrode 1-5 | Polyurethane water dispersion 1E |
| Negative electrode 1-6 | Polyurethane water dispersion 1F |
| Negative electrode 1-7 | Polyurethane water dispersion 1G |
| Negative electrode 1-8 | Polyurethane water dispersion 1H |
| Negative electrode 1-9 | Polyurethane water dispersion 1I |
| Negative electrode 1-10 | Polyurethane water dispersion 1J |
| Negative electrode 1-11 | Polyurethane water dispersion 1K |
| Negative electrode 1-12 | Polyurethane water dispersion 1L |
| Negative electrode 1-13 | Polyurethane water dispersion 1M |
| Negative electrode 1-14 | Polyurethane water dispersion 1N |
| Negative electrode 1-15 | Polyurethane water dispersion 1O |
| Negative electrode 1-16 | SBR |
| Negative electrode 1-17 | Polyurethane water dispersion 1A |
| Negative electrode 1-18 | SBR |
| Negative electrode 1-19 | Polyurethane water dispersion 1I |
| Negative electrode 1-20 | SBR |
| Positive electrode 1-1 | Polyvinylidene fluoride |
| Positive electrode 1-2 | Polyurethane water dispersion 1D |
| Positive electrode 1-3 | Polyurethane water dispersion 1L |
| Positive electrode 1-4 | Polyvinylidene fluoride |
| Positive electrode 1-5 | Polyurethane water dispersion 1D |
| Positive electrode 1-6 | Polyvinylidene fluoride |
| Positive electrode 1-7 | Polyurethane water dispersion 1D |

[Production of Negative Electrode]

(Negative Electrode 1-1)

With a planetary mixer, 100 of natural graphite as a negative electrode active substance, 0.5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 1A as a binder were mixed to prepare a negative electrode slurry having a solid content of 50%. The negative electrode slurry was applied by coating on an electrolytic copper foil having a thickness of 10 μm with a coating machine, dried at 120° C., and then subjected to a roll pressing treatment, thereby affording a negative electrode 1-1 having a negative electrode active substance in an amount of 7 mg/cm$^2$.

(Negative Electrodes 1-2 to 1-16)

Negative electrodes were produced in the same manner as in the negative electrode 1-1 except that the polyurethane water dispersion 1A was changed to the polyurethane water dispersions or a styrene-butadiene rubber (SBR) as described in Table 2.

(Negative Electrode 1-17)

With a planetary mixer, 100 g of SiO (average particle diameter: 4.5 μm, specific surface area: 5.5 m$^2$/g) as a negative electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 1A as a binder were mixed to prepare a negative electrode slurry having a solid content of 50%. The negative electrode slurry was applied by coating on an electrolytic copper foil having a thickness of 10 μm with a coating machine, dried at 120° C., and then subjected to a roll pressing treatment, thereby affording a negative electrode 1-17 having a negative electrode active substance in an amount of 2.5 mg/cm$^2$.
(Negative Electrode 1-18)

A negative electrode 1-18 was produced in the same manner as in the negative electrode 1-17 except that the polyurethane water dispersion 1A was changed to SBR.
(Negative Electrode 1-19)

With a planetary mixer, 100 g of $Li_4Ti_5O_{12}$ as a negative electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 1I as a binder were mixed to prepare a negative electrode slurry having a solid content of 50%. The negative electrode slurry was applied by coating on an electrolytic copper foil having a thickness of 10 µm with a coating machine, dried at 120° C., and then subjected to a roll pressing treatment, thereby affording a negative electrode 1-19 having a negative electrode active substance in an amount of 9.7 mg/cm$^2$.
(Negative Electrode 1-20)

A negative electrode 1-20 was produced in the same manner as in the negative electrode 1-19 except that the polyurethane water dispersion 1I was changed to SBR.
[Production of Positive Electrode]
(Positive Electrode 1-1)

With a planetary mixer, 100 g of $LiNi_{1/3}Co_{1/3}Mn_{1/3}O_2$ as a positive electrode active substance, 7.8 g of carbon black (manufactured by Timcal, Super-P) as a conductive agent, 6 g of polyvinylidene fluoride as a binder, and 61.3 g of N-methyl-2-pyrrolidone as a dispersion medium were mixed to prepare a positive electrode slurry having a solid content of 65%. The positive electrode slurry was applied by coating on an aluminum foil having a thickness of 20 µm with a coating machine, dried at 130° C., and then subjected to a roll pressing treatment, thereby affording a positive electrode 1-1 having a positive electrode active substance in an amount of 13.8 mg/cm$^2$.
(Positive Electrodes 1-2 and 1-3)

With a planetary mixer, 100 g of $LiNi_{1/3}Co_{1/3}Mn_{1/3}O_2$ as a positive electrode active substance, 7.8 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion shown in Table 2 as a binder were mixed to prepare a positive electrode slurry having a solid content of 50%. The positive electrode slurry was applied by coating on an aluminum foil having a thickness of 20 µm with a coating machine, dried at 130° C., and then subjected to a roll pressing treatment, thereby affording positive electrodes 1-2 and 1-3 each having a positive electrode active substance in an amount of 13.8 mg/cm$^2$.
(Positive Electrode 1-4)

With a planetary mixer, 100 g of $LiMn_2O_4$ as a positive electrode active substance, 5 g of carbon black (manufactured by Timcal, Super-P) as a conductive agent, 6 g of polyvinylidene fluoride as a binder, and 59.8 g of N-methyl-2-pyrrolidone as a dispersion medium were mixed to prepare a positive electrode slurry having a solid content of 65%. The positive electrode slurry was applied by coating on an aluminum foil having a thickness of 20 µm with a coating machine, dried at 130° C., and then subjected to a roll pressing treatment, thereby affording a positive electrode 1-4 having a positive electrode active substance in an amount of 22 mg/cm$^2$.
(Positive Electrode 1-5)

With a planetary mixer, 100 g of $LiMn_2O_4$ as a positive electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 1D as a binder were mixed to prepare a positive electrode slurry having a solid content of 50%. The positive electrode slurry was coated on an aluminum foil having a thickness of 20 µm with a coating machine, dried at 130° C., and then subjected to a roll pressing treatment, thereby affording a positive electrode 1-5 having a positive electrode active substance in an amount of 22 mg/cm$^2$.
(Positive Electrode 1-6)

With a planetary mixer, 100 g of $LiFePO_4$ as a positive electrode active substance, 5 g of carbon black (manufactured by Timcal, Super-P) as a conductive agent, 6 g of polyvinylidene fluoride as a binder, and 135.7 g of N-methyl-2-pyrrolidone as a dispersion medium were mixed to prepare a positive electrode slurry having a solid content of 45%. The positive electrode slurry was applied by coating on an aluminum foil having a thickness of 20 µm with a coating machine, dried at 130° C., and then subjected to a roll pressing treatment, thereby affording a positive electrode 1-6 having a positive electrode active substance in an amount of 14.5 mg/cm$^2$.
(Positive Electrode 1-7)

With a planetary mixer, 100 g of $LiFePO_4$ as a positive electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 1D as a binder were mixed to prepare a positive electrode slurry having a solid content of 50%. The positive electrode slurry was coated on an aluminum foil having a thickness of 20 µm with a coating machine, dried at 130° C., and then subjected to a roll pressing treatment, thereby affording a positive electrode 1-7 having a positive electrode active substance in an amount of 14.5 mg/cm$^2$.
[Evaluation of Electrode]

The electrodes thus obtained were subjected to the following evaluations. The evaluation results are shown in Table 3.

Evaluation of Bindability: The electrode obtained above was folded by 1808 with the coated surface directed outward and unfolded, and then the degree of drop-off of the active substance on the coated surface (the proportion of the area of the drop-off portion with respect to the total) was visually judged.

Evaluation Criteria
 5: 0% drop-off
 4: 25% drop-off
 3: 50% drop-off
 2: 75% drop-off
 1: 100% drop-off Evaluation of Resistance to Electrolytic Solution: The electrode obtained above was immersed in a mixed solvent of EC (ethylene carbonate)/PC (propylene carbonate)/DMC (dimethyl carbonate)/EMC (ethyl methyl carbonate)/DEC (diethyl carbonate)=1/1/1/1/1 (vol) at 60° C. for 7 days, and then the appearance of the coated film was visually judged.
Evaluation Criteria
 A: no change is observed on coated film
 B: several blisters are formed on coated film
 C: coated film is peeled off

TABLE 3

|  | Kind of electrode | Evaluation of bindability | Evaluation of resistance to electrolytic solution |
|---|---|---|---|
| Ex. 1-1 | Negative electrode 1-1 | 4 | A |
| Ex. 1-2 | Negative electrode 1-2 | 5 | A |
| Ex. 1-3 | Negative electrode 1-3 | 4 | A |
| Ex. 1-4 | Negative electrode 1-4 | 4 | A |
| Ex. 1-5 | Negative electrode 1-5 | 5 | A |
| Ex. 1-6 | Negative electrode 1-6 | 5 | A |
| Ex. 1-7 | Negative electrode 1-7 | 5 | A |
| Ex. 1-8 | Negative electrode 1-8 | 4 | A |
| Ex. 1-9 | Negative electrode 1-9 | 5 | A |
| Ex. 1-10 | Negative electrode 1-10 | 5 | A |
| Ex. 1-11 | Negative electrode 1-11 | 4 | A |
| Ex. 1-12 | Negative electrode 1-17 | 4 | A |
| Ex. 1-13 | Negative electrode 1-19 | 5 | A |
| Ex. 1-14 | Positive electrode 1-2 | 5 | A |
| Ex. 1-15 | Positive electrode 1-5 | 4 | A |
| Ex. 1-16 | Positive electrode 1-7 | 5 | A |
| Comp. Ex. 1-1 | Negative electrode 1-12 | 3 | B |
| Comp. Ex. 1-2 | Negative electrode 1-13 | 2 | B |
| Comp. Ex. 1-3 | Negative electrode 1-14 | 3 | B |
| Comp. Ex. 1-4 | Negative electrode 1-15 | 3 | A |
| Comp. Ex. 1-5 | Negative electrode 1-16 | 3 | A |
| Comp. Ex. 1-6 | Negative electrode 1-18 | 3 | A |
| Comp. Ex. 1-7 | Negative electrode 1-20 | 3 | A |
| Comp. Ex. 1-8 | Positive electrode 1-1 | 3 | A |
| Comp. Ex. 1-9 | Positive electrode 1-3 | 3 | A |
| Comp. Ex. 1-10 | Positive electrode 1-4 | 3 | B |
| Comp. Ex. 1-11 | Positive electrode 1-6 | 3 | A |

The following will describe Examples in the case of containing, as the (B) component, a polycarbonate diol having the carbon number between carbonate bond chains of less than 6, together with Comparative Examples.

Synthesis of Polycarbonate Diol (Synthetic Example 2-1) Synthesis of Polycarbonate Diol A To a 500 ml separable flask equipped with a thermometer, a nitrogen sealing tube and a stirrer were charged 177.1 g of diethyl carbonate and 146.0 g of 1,3-propanediol, and tetra-n-butoxytitanium was added thereto as a catalyst so as to be a concentration of 100 ppm. Under a nitrogen flow, a transesterification reaction was carried out at 200° C. for about 15 hours. Generated ethanol and excess diethyl carbonate were removed under reduced pressure, thereby affording a polycarbonate diol A having a hydroxyl value of 56.2 mgKOH/g.

(Synthetic Example 2-2) Synthesis of Polycarbonate Diol B

Production was performed in the same manner as in Synthetic Example 2-1 except that 1,3-propanediol was changed to 73.0 g of 1,3-propanediol and 73.0 g of 1,4-butanediol, thereby affording a polycarbonate diol B having a hydroxyl value of 56.1 mgKOH/g which contains 1,3-propanediol and 1,4-butanediol as constituents.

(Synthetic Example 2-3) Synthesis of Polycarbonate Diol C

Production was performed in the same manner as in Synthetic Example 2-1 except that 1,3-propanediol was changed to 146.0 g of 1,4-butanediol, thereby affording a polycarbonate diol C having a hydroxyl value of 56.2 mgKOH/g.

(Synthetic Example 2-4) Synthesis of Polycarbonate Diol D

Production was performed in the same manner as in Synthetic Example 2-1 except that 1,3-propanediol was changed to 73.0 g of 1,4-butanediol and 84.3 g of 1,5-pentanediol, thereby affording a polycarbonate diol D having a hydroxyl value of 37.5 mgKOH/g which contains 1,4-butanediol and 1,5-pentanediol as constituents.

(Synthetic Example 2-5) Synthesis of Polycarbonate Diol B

Production was performed in the same manner as in Synthetic Example 2-1 except that 1,3-propanediol was changed to 167.0 g of 1,5-pentanediol, thereby affording a polycarbonate diol E having a hydroxyl value of 37.4 mgKOH/g.

(Synthetic Example 2-6) Synthesis of Polycarbonate Diol F

Production was performed in the same manner as in Synthetic Example 2-1 except that 1,3-propanediol was changed to 146.0 g of 2-methyl-1,3-propanediol, thereby affording a polycarbonate diol F having a hydroxyl value of 56.2 mgKOH/g.

(Synthetic Example 2-7) Synthesis of Polycarbonate Diol G

Production was performed in the same manner as in Synthetic Example 2-1 except that 1,3-propanediol was changed to 117.0 g of 1,4-butanediol and 38.3 g of 1,6-hexanediol, thereby affording a polycarbonate diol G having a hydroxyl value of 56.2 mgKOH/g which contains 1,4-butanediol and 1,6-hexanediol as constituents.

(Synthetic Example 2-8) Synthesis of Polycarbonate Diol H

Production was performed in the same manner as in Synthetic Example 2-1 except that 1,3-propanediol was changed to 192.0 g of 1,6-hexanediol, thereby affording a polycarbonate diol H having a hydroxyl value of 56.1 mgKOH/g.

(Synthetic Example 2-9) Synthesis of Polycarbonate Diol I

Production was performed in the same manner as in Synthetic Example 2-1 except that 1,3-propanediol was changed to 260.0 g of 1,9-nonanediol, thereby affording a polycarbonate diol I having a hydroxyl value of 56.1 mgKOH/g.

Synthesis of Polyurethane Water Dispersion (Synthetic Example 2-10) Synthesis of
Polyurethane Water Dispersion 2A To a four-neck flask equipped with a stirrer, a reflux condenser, a thermometer, and a nitrogen blowing tube were added 208.0 parts by mass of a polycarbonate diol A, 3.0 parts by mass of trimethylolpropane (number of active hydrogen group: 3), 11.0 parts by mass of dimethylolpropionic acid (number of active hydrogen group: 2), 78.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 2.0% with respect to the nonvolatile content. The solution was cooled to 45° C. and neutralized by adding 8.3 parts by mass of triethylamine, and then emulsified and dispersed by using a homogenizer while gradually adding 900 parts by mass of water thereto. Subsequently, an aqueous solution obtained by diluting 3.9 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2A having a nonvolatile content of about 30%.

(Synthetic Example 2-11) Synthesis of
Polyurethane Water Dispersion 2B

To a four-neck flask equipped with a stirrer, a reflux condenser, a thermometer, and a nitrogen blowing tube were added 206.4 parts by mass of a polycarbonate diol B, 3.6 parts by mass of trimethylolpropane (number of active hydrogen group: 3), 13.0 parts by mass of dimethylolpropionic acid (number of active hydrogen group: 2), 77.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.3% with respect to the nonvolatile content. The solution was cooled to 45° C. and neutralized by adding 9.8 parts by mass of triethylamine, and then emulsified and dispersed by using a homogenizer while gradually adding 900 parts by mass of water thereto. Subsequently, an aqueous solution obtained by diluting 2.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2B having a nonvolatile content of about 30%.

(Synthetic Example 2-12) Synthesis of
Polyurethane Water Dispersion 2C

To a four-neck flask equipped with a stirrer, a reflux condenser, a thermometer, and a nitrogen blowing tube were added 206.4 parts by mass of a polycarbonate diol B, 3.6 parts by mass of trimethylolpropane (number of active hydrogen group: 3), 13.0 parts by mass of dimethylolpropionic acid (number of active hydrogen group: 2), 77.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.3% with respect to the nonvolatile content. The solution was cooled to 45° C. and neutralized by adding 9.8 parts by mass of triethylamine, and then emulsified and dispersed by using a homogenizer while gradually adding 900 parts by mass of water thereto. Subsequently, an aqueous solution obtained by diluting 2.9 parts by mass of diethylenetriamine (number of active hydrogen group: 3) with 100 parts by mass of water was added thereto, and chain extending reaction was performed for 1 hour. The solvent was removed while heating at 50° C. under reduced pressure, thereby affording a polyurethane water dispersion 2C having a nonvolatile content of about 30%.

(Synthetic Example 2-13) Synthesis of
Polyurethane Water Dispersion 2D

To a four-neck flask equipped with a stirrer, a reflux condenser, a thermometer, and a nitrogen blowing tube were added 205.5 parts by mass of a polycarbonate diol C, 3.50 parts by mass of trimethylolpropane (number of active hydrogen group: 3), 12.0 parts by mass of dimethylolpropionic acid (number of active hydrogen group: 2), 69.50 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.8% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 3.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2D having a nonvolatile content of about 30%.

(Synthetic Example 2-14) Synthesis of
Polyurethane Water Dispersion 2E

To a four-neck flask equipped with a stirrer, a reflux condenser, a thermometer, and a nitrogen blowing tube were added 210.0 parts by mass of a polycarbonate diol B, 3.50 parts by mass of trimethylolpropane (number of active hydrogen group: 3), 12.0 parts by mass of dimethylolpropionic acid (number of active hydrogen group: 2), 74.5 parts by mass of polymeric MDI, and 200 parts by mass of methyl ethyl ketone, and the reaction was carried out at 75° C. for 4 hours to afford a methyl ethyl ketone solution of a urethane prepolymer having a free isocyanate group content of 1.6% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 3.1 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2E having a nonvolatile content of about 30%.

(Synthetic Example 2-15) Synthesis of
Polyurethane Water Dispersion 2F

To a four-neck flask equipped with a stirrer, a reflux condenser, a thermometer, and a nitrogen blowing tube were added 216.7 parts by mass of a polycarbonate diol D, 3.30 parts by mass of trimethylolpropane (number of active hydrogen group: 3), 12.5 parts by mass of dimethylolpropionic acid (number of active hydrogen group: 2), 67.50 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.4% with respect to the nonvolatile content. The solution was cooled to 45° C. and neutralized by adding 9.4 parts by mass of triethylamine, and then emulsified and dispersed by using a homogenizer while gradually adding 900 parts by mass of water thereto. Subsequently, an aqueous solution obtained by diluting 2.7 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2F having a nonvolatile content of about 30%.

(Synthetic Example 2-16) Synthesis of Polyurethane Water Dispersion 2G

To a four-neck flask equipped with a stirrer, a reflux condenser, a thermometer, and a nitrogen blowing tube were added 216.7 parts by mass of a polycarbonate diol E, 3.30 parts by mass of trimethylolpropane (number of active hydrogen group: 3), 12.5 parts by mass of dimethylolpropionic acid (number of active hydrogen group: 2), 67.50 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.4% with respect to the nonvolatile content. The solution was cooled to 45° C. and neutralized by adding 9.4 parts by mass of triethylamine, and then emulsified and dispersed by using a homogenizer while gradually adding 900 parts by mass of water thereto. Subsequently, an aqueous solution obtained by diluting 2.7 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2G having a nonvolatile content of about 30%.

(Synthetic Example 2-17) Synthesis of Polyurethane Water Dispersion 2H

To a four-neck flask equipped with a stirrer, a reflux condenser, a thermometer, and a nitrogen blowing tube were added 205.5 parts by mass of a polycarbonate diol F, 3.50 parts by mass of trimethylolpropane (number of active hydrogen group: 3), 12.0 parts by mass of dimethylolpropionic acid (number of active hydrogen group: 2), 79.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 1.6% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 3.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2H having a nonvolatile content of about 30%.

(Synthetic Example 2-18) Synthesis of Polyurethane Water Dispersion 2I

To a four-neck flask equipped with a stirrer, a reflux condenser, a thermometer, and a nitrogen blowing tube were added 174.0 parts by mass of a polycarbonate diol F, 8.0 parts by mass of trimethylolpropane (number of active hydrogen group: 3), 12.0 parts by mass of dimethylolpropionic acid (number of active hydrogen group: 2), 79.0 parts by mass of dicyclohexylmethane diisocyanate, and 200 parts by mass of methyl ethyl ketone, and the reaction was carried out at 75° C. for 4 hours to afford a methyl ethyl ketone solution of a urethane prepolymer having a free isocyanate group content of 3.7% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 8.2 parts by mass of diethylenetriamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2I having a nonvolatile content of about 30%.

(Synthetic Example 2-19) Synthesis of Polyurethane Water Dispersion 2J

To a four-neck flask equipped with a stirrer, a reflux condenser, a thermometer, and a nitrogen blowing tube were added 235.0 parts by mass of a polycarbonate diol C, 3.0 parts by mass of trimethylolpropane (number of active hydrogen group: 3), 12.0 parts by mass of dimethylolpropionic acid (number of active hydrogen group: 2), 50.00 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 1.4% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 2.7 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2J having a nonvolatile content of about 30%.

(Synthetic Example 2-20) Synthesis of Polyurethane Water Dispersion 2K

To a four-neck flask equipped with a stirrer, a reflux condenser, a thermometer, and a nitrogen blowing tube were added 208.7 parts by mass of a polycarbonate diol G, 3.3 parts by mass of trimethylolpropane (number of active hydrogen group: 3), 12.0 parts by mass of dimethylolpropionic acid (number of active hydrogen group: 2), 76.0 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 1.4% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 2.9 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2K having a nonvolatile content of about 30%.

(Synthetic Example 2-21) Synthesis of Polyurethane Water Dispersion 2L

To a four-neck flask equipped with a stirrer, a reflux condenser, a thermometer, and a nitrogen blowing tube were added 239.8 parts by mass of a polycarbonate diol H, 0.30 parts by mass of trimethylolpropane (number of active hydrogen group: 3), 12.0 parts by mass of dimethylolpropionic acid (number of active hydrogen group: 2), 47.90 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 1.8% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 3.5 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2L having a nonvolatile content of about 30%.

(Synthetic Example 2-22) Synthesis of Polyurethane Water Dispersion 2M

To a four-neck flask equipped with a stirrer, a reflux condenser, a thermometer, and a nitrogen blowing tube were added 195.7 parts by mass of a polycarbonate diol H, 12.3 parts by mass of trimethylolpropane (number of active hydrogen group: 3), 12.0 parts by mass of dimethylolpropionic acid (number of active hydrogen group: 2), 80.0 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a free isocyanate group content of 4.0% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 8.8 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2M having a nonvolatile content of about 30%.

(Synthetic Example 2-23) Synthesis of Polyurethane Water Dispersion 2N

To a four-neck flask equipped with a stirrer, a reflux condenser, a thermometer, and a nitrogen blowing tube were added 240.0 parts by mass of a polycarbonate diol I, 12.0 parts by mass of dimethylolpropionic acid (number of active hydrogen group: 2), 48.00 parts by mass of hexamethylene diisocyanate, and 200 parts by mass of methyl ethyl ketone, and the reaction was carried out at 75° C. for 4 hours to afford a methyl ethyl ketone solution of a urethane prepolymer having a fee isocyanate group content of 1.9% with respect to the nonvolatile content. The solution was cooled to 45° C. and neutralized by adding 9.0 parts by mass of triethylamine, and then emulsified and dispersed by using a homogenizer while gradually adding 900 parts by mass of water thereto. Subsequently, an aqueous solution obtained by diluting 3.7 parts by mass of ethylenediamine (number of active hydrogen group: 2) with 100 parts by mass of water was added thereto, and chain extending reaction was performed for 1 hour. The solvent was removed while heating at 50° C. under reduced pressure, thereby affording a polyurethane water dispersion 2N having a nonvolatile content of about 30%.

[Evaluation of Polyurethane Water Dispersion]

The polyurethane water dispersions obtained as described above were subjected to the following measurements. The results are shown in Table 4.

Weight of the nonvolatile content of the polyurethane water dispersion: Measured in accordance with JIS K 6828.

Crosslinking density in the resin solid content of the polyurethane water dispersion: Calculated according to the Mathematical Expression 1 shown above.

Acid value of the polyurethane resin: Measured in accordance with JIS K 0070-1992.

Carbonate bond equivalent, urea bond equivalent and urethane bond equivalent: Calculated according to the Mathematical Expression 2, Mathematical Expression 3 and Mathematical Expression 4, respectively.

Measurement of average particle diameter of the polyurethane water dispersion: The average particle diameter was measured with Microtrac UPA-UZ152 (manufactured by Nikkiso Co., Ltd.), and a 50% average value was calculated as the average particle diameter.

TABLE 4

| Polyurethane water dispersion | Crosslinking density | Average particle diameter (μm) | Acid value (mgKOH/g) | Urethane bond equivalent (g/eq) | Urea bond equivalent (g/eq) | Carbonate bond equivalent (g/eq) |
|---|---|---|---|---|---|---|
| 2A | 0.07 | 0.02 | 15 | 674 | 2106 | 149 |
| 2B | 0.09 | 0.02 | 18 | 614 | 3180 | 160 |

TABLE 4-continued

| Polyurethane water dispersion | Crosslinking density | Average particle diameter (μm) | Acid value (mgKOH/g) | Urethane bond equivalent (g/eq) | Urea bond equivalent (g/eq) | Carbonate bond equivalent (g/eq) |
|---|---|---|---|---|---|---|
| 2C | 0.18 | 0.03 | 18 | 615 | 3186 | 160 |
| 2D | 0.09 | 0.03 | 16 | 632 | 2364 | 171 |
| 2E | 0.09 | 0.02 | 16 | 632 | 2610 | 158 |
| 2F | 0.08 | 0.02 | 17 | 725 | 3086 | 168 |
| 2G | 0.08 | 0.04 | 17 | 725 | 3086 | 182 |
| 2H | 0.09 | 0.02 | 16 | 632 | 2364 | 171 |
| 2I | 0.45 | 0.03 | 16 | 568 | 1154 | 205 |
| 2J | 0.07 | 0.05 | 16 | 612 | 3030 | 149 |
| 2K | 0.08 | 0.03 | 16 | 639 | 2853 | 177 |
| 2L | 0.007 | 0.02 | 16 | 691 | 2326 | 182 |
| 2M | 0.57 | 0.02 | 16 | 467 | 1065 | 227 |
| 2N | 0 | 0.03 | 16 | 702 | 2200 | 235 |

[Production of Electrode]

The binders used for production of electrodes are shown in Table 5 below.

TABLE 5

| Kind of electrode | Kind of binder |
|---|---|
| Negative electrode 2-1 | Polyurethane water dispersion 2A |
| Negative electrode 2-2 | Polyurethane water dispersion 2B |
| Negative electrode 2-3 | Polyurethane water dispersion 2C |
| Negative electrode 2-4 | Polyurethane water dispersion 2D |
| Negative electrode 2-5 | Polyurethane water dispersion 2E |
| Negative electrode 2-6 | Polyurethane water dispersion 2F |
| Negative electrode 2-7 | Polyurethane water dispersion 2G |
| Negative electrode 2-8 | Polyurethane water dispersion 2H |
| Negative electrode 2-9 | Polyurethane water dispersion 2I |
| Negative electrode 2-10 | Polyurethane water dispersion 2J |
| Negative electrode 2-11 | Polyurethane water dispersion 2K |
| Negative electrode 2-12 | Polyurethane water dispersion 2L |
| Negative electrode 2-13 | Polyurethane water dispersion 2M |
| Negative electrode 2-14 | Polyurethane water dispersion 2N |
| Negative electrode 2-15 | SBR |
| Negative electrode 2-16 | Polyurethane water dispersion 2C |
| Negative electrode 2-17 | SBR |
| Negative electrode 2-18 | Polyurethane water dispersion 2H |
| Negative electrode 2-19 | SBR |
| Positive electrode 2-1 | Polyvinylidene fluoride |
| Positive electrode 2-2 | Polyurethane water dispersion 2B |
| Positive electrode 2-3 | Polyurethane water dispersion 2M |
| Positive electrode 2-4 | Polyvinylidene fluoride |
| Positive electrode 2-5 | Polyurethane water dispersion 2F |
| Positive electrode 2-6 | Polyvinylidene fluoride |
| Positive electrode 2-7 | Polyurethane water dispersion 2H |

[Production of Negative Electrode]
(Negative Electrode 2-1)

With a planetary mixer, 100 g of natural graphite as a negative electrode active substance, 0.5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 2A as a binder were mixed to prepare a negative electrode slurry having a solid content of 50%. The negative electrode slurry was applied by coating on an electrolytic copper foil having a thickness of 10 μm with a coating machine, dried at 120° C., and then subjected to a roll pressing treatment, thereby affording a negative electrode 2-1 having a negative electrode active substance in an amount of 7 mg/cm$^2$.
(Negative Electrodes 2-2 to 2-15)

Negative electrodes 2-2 to 2-15 were produced in the same manner as in the negative electrode 2-1 except that the polyurethane water dispersion 2A was changed to the polyurethane water dispersions or SBR shown in Table 5.
(Negative Electrode 2-16)

With a planetary mixer, 100 g of SiO (average particle diameter: 4.5 μm, specific surface area: 5.5 m$^2$/g) as a negative electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 2C as a binder were mixed to prepare a negative electrode slurry having a solid content of 50%. The negative electrode slurry was applied by coating on an electrolytic copper foil having a thickness of 10 μm with a coating machine, dried at 120° C., and then subjected to a roll pressing treatment, thereby affording a negative electrode 2-16 having a negative electrode active substance in an amount of 2.5 mg/cm$^2$.
(Negative Electrode 2-17)

A negative electrode 2-16 was produced in the same manner as in the negative electrode 16 except that the polyurethane water dispersion 2C was changed to SBR.
(Negative Electrode 2-18)

With a planetary mixer, 100 g of Li$_4$Ti$_5$O$_{12}$ as a negative electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 2H as a binder were mixed to prepare a negative electrode slurry having a solid content of 50%. The negative electrode slurry was applied by coating on an electrolytic copper foil having a thickness of 10 μm with a coating machine, dried at 120° C., and then subjected to a roll pressing treatment, thereby affording a negative electrode 2-18 having a negative electrode active substance in an amount of 9.7 mg/cm$^2$.
(Negative Electrode 2-19)

A negative electrode 2-19 was produced in the same manner as in the negative electrode 2-18 except that the polyurethane water dispersion 2H was changed to SBR.

[Production of Positive Electrode]
(Positive Electrode 2-1)

With a planetary mixer, 100 g of LiNi$_{1/3}$Co$_{1/3}$Mn$_{1/3}$O$_2$ as a positive electrode active substance, 7.8 g of carbon black (manufactured by Timcal, Super-P) as a conductive agent, 6 g of polyvinylidene fluoride as a binder, and 61.3 g of N-methyl-2-pyrrolidone as a dispersion medium were mixed to prepare a positive electrode slurry having a solid content of 65%. The positive electrode slurry was applied by coating on an aluminum foil having a thickness of 20 μm with a coating machine, dried at 130° C., and then subjected to a roll pressing treatment, thereby affording a positive electrode 2-1 having a positive electrode active substance in an amount of 13.8 mg/cm$^2$.

(Positive Electrodes 2-2 and 2-3)

With a planetary mixer, 100 g of LiNi$_{1/3}$Co$_{1/3}$Mn$_{1/3}$O$_2$ as a positive electrode active substance, 7.8 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of each of the polyurethane water dispersions shown in Table 5 as a binder were mixed to prepare a positive electrode slurry having a solid content of 50%. The positive electrode slurry was applied by coating on an aluminum foil having a thickness of 20 μm with a coating machine, dried at 130° C., and then subjected to a roll pressing treatment, thereby affording positive electrodes 2-2 and 2-3 each having a positive electrode active substance in an amount of 13.8 mg/cm$^2$.

(Positive Electrode 2-4)

With a planetary mixer, 100 g of LiMn$_2$O$_4$ as a positive electrode active substance, 5 g of carbon black (manufactured by Timcal, Super-P) as a conductive agent, 6 g of polyvinylidene fluoride as a binder, and 59.8 g of N-methyl-2-pyrrolidone as a dispersion medium were mixed to prepare a positive electrode slurry having a solid content of 65%. The positive electrode slurry was applied by coating on an aluminum foil having a thickness of 20 μm with a coating machine, dried at 130° C., and then subjected to a roll pressing treatment, thereby affording a positive electrode 2-4 having a positive electrode active substance in an amount of 22 mg/cm$^2$.

(Positive Electrode 2-5)

With a planetary mixer, 100 g of LiMn$_2$O$_4$ as a positive electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 2F as a binder were mixed to prepare a positive electrode slurry having a solid content of 50%. The positive electrode slurry was applied by coating on an aluminum foil having a thickness of 20 μm with a coating machine, dried at 130° C., and then subjected to a roll pressing treatment, thereby affording a positive electrode 2-5 having a positive electrode active substance in an amount of 22 mg/cm$^2$.

(Positive Electrode 2-6)

With a planetary mixer, 100 g of LiFePO$_4$ as a positive electrode active substance, 5 g of carbon black (manufactured by Timcal, Super-P) as a conductive agent, 6 g of polyvinylidene fluoride as a binder, and 135.7 g of N-methyl-2-pyrrolidone as a dispersion medium were mixed to prepare a positive electrode slurry having a solid content of 45%. The positive electrode slurry was applied by coating on an aluminum foil having a thickness of 20 μm with a coating machine, dried at 130° C., and then subjected to a roll pressing treatment, thereby affording a positive electrode 2-6 having a positive electrode active substance in an amount of 14.5 mg/cm$^2$.

(Positive Electrode 2-7)

With a planetary mixer, 100 g of LiFePO$_4$ as a positive electrode active substance, 5 g of carbon black (manufactured by Timcal, Super-P) as a conductive agent, 100 g of a 2% by mass aqueous solution of carboxymethyl cellulose sodium salt (manufactured by DKS Co. Ltd., trade name: Cellogen WS-C) as a thickener, and 6.7 g of a 30% by mass solution of the polyurethane water dispersion 2H as a binder were mixed to prepare a positive electrode slurry having a solid content of 50%. The positive electrode slurry was applied by coating on an aluminum foil having a thickness of 20 μm with a coating machine, dried at 130° C., and then subjected to a roll pressing treatment, thereby affording a positive electrode 2-7 having a positive electrode active substance in an amount of 14.5 mg/cm$^2$.

[Evaluation of Electrode]

The electrodes thus obtained were subjected to the evaluation of bindability according to the same method as described above. The evaluation results are shown in Table 6.

TABLE 6

|  | Kind of electrode | Evaluation of bindability |
| --- | --- | --- |
| Ex. 2-1 | Negative electrode 2-1 | 4 |
| Ex. 2-2 | Negative electrode 2-2 | 5 |
| Ex. 2-3 | Negative electrode 2-3 | 4 |
| Ex. 2-4 | Negative electrode 2-4 | 5 |
| Ex. 2-5 | Negative electrode 2-5 | 4 |
| Ex. 2-6 | Negative electrode 2-6 | 5 |
| Ex. 2-7 | Negative electrode 2-7 | 5 |
| Ex. 2-8 | Negative electrode 2-8 | 4 |
| Ex. 2-9 | Negative electrode 2-9 | 5 |
| Ex. 2-10 | Negative electrode 2-10 | 4 |
| Ex. 2-11 | Negative electrode 2-11 | 4 |
| Ex. 2-12 | Negative electrode 2-16 | 5 |
| Ex. 2-13 | Negative electrode 2-18 | 4 |
| Ex. 2-14 | Positive electrode 2-2 | 4 |
| Ex. 2-15 | Positive electrode 2-4 | 5 |
| Ex. 2-16 | Positive electrode 2-6 | 5 |
| Comp. Ex. 2-1 | Negative electrode 2-12 | 3 |
| Comp. Ex. 2-2 | Negative electrode 2-13 | 2 |
| Comp. Ex. 2-3 | Negative electrode 2-14 | 3 |
| Comp. Ex. 2-4 | Negative electrode 2-15 | 3 |
| Comp. Ex. 2-5 | Negative electrode 2-17 | 3 |
| Comp. Ex. 2-6 | Negative electrode 2-19 | 3 |
| Comp. Ex. 2-7 | Positive electrode 2-1 | 3 |
| Comp. Ex. 2-8 | Positive electrode 2-3 | 3 |
| Comp. Ex. 2-9 | Positive electrode 2-4 | 3 |
| Comp. Ex. 2-10 | Positive electrode 2-6 | 3 |

[Production of Lithium Secondary Battery]

The positive electrode and the negative electrode obtained as described above were combined as shown in Tables 7 and 8 below and laminated on each other with a polyolefinic (PE/PP) separator as a separator intervening between the electrodes, and a positive electrode terminal and a negative electrode terminal were ultrasonic-welded to the positive and negative electrodes, respectively. The laminate was placed in an aluminum-laminated package, which was then heat-sealed while leaving an opening for injecting a liquid. Thus, there was produced a battery before liquid injection, which had a positive electrode area of 18 cm$^2$ and a negative electrode area of 19.8 cm$^2$. Thereinto was charged an electrolytic solution containing LiPF$_6$ (1.0 mol/L) dissolved in a mixed solvent of ethylene carbonate and diethyl carbonate (30/70 in volume ratio), and the opening was heat-sealed, thereby affording a battery for evaluation.

TABLE 7

| | Constitution of electrodes | |
|---|---|---|
| | Negative electrode | Positive electrode |
| Ex. 1-17 | Negative electrode 1-1 | Positive electrode 1-1 |
| Ex. 1-18 | Negative electrode 1-2 | Positive electrode 1-1 |
| Ex. 1-19 | Negative electrode 1-3 | Positive electrode 1-1 |
| Ex. 1-20 | Negative electrode 1-4 | Positive electrode 1-1 |
| Ex. 1-21 | Negative electrode 1-5 | Positive electrode 1-1 |
| Ex. 1-22 | Negative electrode 1-6 | Positive electrode 1-1 |
| Ex. 1-23 | Negative electrode 1-7 | Positive electrode 1-1 |
| Ex. 1-24 | Negative electrode 1-8 | Positive electrode 1-1 |
| Ex. 1-25 | Negative electrode 1-9 | Positive electrode 1-1 |
| Ex. 1-26 | Negative electrode 1-10 | Positive electrode 1-1 |
| Ex. 1-27 | Negative electrode 1-11 | Positive electrode 1-1 |
| Ex. 1-28 | Negative electrode 1-17 | Positive electrode 1-1 |
| Ex. 1-29 | Negative electrode 1-19 | Positive electrode 1-1 |
| Ex. 1-30 | Negative electrode 1-16 | Positive electrode 1-2 |
| Ex. 1-31 | Negative electrode 1-16 | Positive electrode 1-5 |
| Ex. 1-32 | Negative electrode 1-16 | Positive electrode 1-7 |
| Ex. 1-33 | Negative electrode 1-2 | Positive electrode 1-2 |
| Comp. Ex. 1-12 | Negative electrode 1-12 | Positive electrode 1-1 |
| Comp. Ex. 1-13 | Negative electrode 1-13 | Positive electrode 1-1 |
| Comp. Ex. 1-14 | Negative electrode 1-14 | Positive electrode 1-1 |
| Comp. Ex. 1-15 | Negative electrode 1-15 | Positive electrode 1-1 |
| Comp. Ex. 1-16 | Negative electrode 1-16 | Positive electrode 1-1 |
| Comp. Ex. 1-17 | Negative electrode 1-18 | Positive electrode 1-1 |
| Comp. Ex. 1-18 | Negative electrode 1-20 | Positive electrode 1-1 |
| Comp. Ex. 19 | Negative electrode 1-16 | Positive electrode 1-3 |
| Comp. Ex. 20 | Negative electrode 1-16 | Positive electrode 1-4 |
| Comp. Ex. 21 | Negative electrode 1-16 | Positive electrode 1-6 |

TABLE 8

| | Constitution of electrodes | |
|---|---|---|
| | Negative electrode | Positive electrode |
| Ex. 2-17 | Negative electrode 2-1 | Positive electrode 2-1 |
| Ex. 2-18 | Negative electrode 2-2 | Positive electrode 2-1 |
| Ex. 2-19 | Negative electrode 2-3 | Positive electrode 2-1 |
| Ex. 2-20 | Negative electrode 2-4 | Positive electrode 2-1 |
| Ex. 2-21 | Negative electrode 2-5 | Positive electrode 2-1 |
| Ex. 2-22 | Negative electrode 2-6 | Positive electrode 2-1 |
| Ex. 2-23 | Negative electrode 2-7 | Positive electrode 2-1 |
| Ex. 2-24 | Negative electrode 2-8 | Positive electrode 2-1 |
| Ex. 2-25 | Negative electrode 2-9 | Positive electrode 2-1 |
| Ex. 2-26 | Negative electrode 2-10 | Positive electrode 2-1 |
| Ex. 2-27 | Negative electrode 2-11 | Positive electrode 2-1 |
| Ex. 2-28 | Negative electrode 2-16 | Positive electrode 2-1 |
| Ex. 2-29 | Negative electrode 2-18 | Positive electrode 2-1 |
| Ex. 2-30 | Negative electrode 2-15 | Positive electrode 2-2 |
| Ex. 2-31 | Negative electrode 2-15 | Positive electrode 2-5 |
| Ex. 2-32 | Negative electrode 2-15 | Positive electrode 2-7 |
| Ex. 2-33 | Negative electrode 2-2 | Positive electrode 2-2 |
| Comp. Ex. 2-11 | Negative electrode 2-12 | Positive electrode 2-1 |
| Comp. Ex. 2-12 | Negative electrode 2-13 | Positive electrode 2-1 |
| Comp. Ex. 2-13 | Negative electrode 2-14 | Positive electrode 2-1 |
| Comp. Ex. 2-14 | Negative electrode 2-15 | Positive electrode 2-1 |
| Comp. Ex. 2-15 | Negative electrode 2-17 | Positive electrode 2-1 |
| Comp. Ex. 2-16 | Negative electrode 2-19 | Positive electrode 2-1 |
| Comp. Ex. 2-17 | Negative electrode 2-15 | Positive electrode 2-3 |
| Comp. Ex. 2-18 | Negative electrode 2-15 | Positive electrode 2-4 |
| Comp. Ex. 2-19 | Negative electrode 2-15 | Positive electrode 2-6 |

[Evaluation of Battery Performance]

The lithium secondary batteries thus produced were subjected to a performance test at 20° C. The test method was as follows. The test results are shown in Tables 9 and 10.

(Cell Impedance)

For the cell impedance, a resistance value at a frequency of 1 kHz was measured by using an impedance analyzer (manufactured by ZAHNER).

(Charge and Discharge Cycle Characteristics)

The charge and discharge cycle characteristics were measured under the following conditions.

In the case where $LiNi_{1/3}Co_{1/3}Mn_{1/3}O_2$ or $LiMn_2O_4$ was used as the positive electrode active substance and natural graphite was used as the negative electrode active substance, a cycle in which CC (constant current) charging was conducted until 4.2 V at a current density corresponding to 1 C, subsequently switched to CV (constant voltage) charging at 4.2 V and a charging was conducted for 1.5 hours, and then CC discharging was conducted until 2.7 V at a current density corresponding to 1 C, was performed for 300 cycles at 20° C. The ratio of the 1 C discharge capacity after the 300 cycles with respect to the initial 1 C discharge capacity was designated as a 1 C charge and discharge cycle retention rate.

In the case where $LiFePO_4$ was used as the positive electrode active substance and natural graphite was used as the negative electrode active substance, a cycle in which CC (constant current) charging was conducted until 4.0 V at a current density corresponding to 1 C, subsequently switched to CV (constant voltage) charging at 4.0 V and a charging was conducted for 1.5 hours, and then CC discharging was conducted until 2.0 V at a current density corresponding to 1 C, was performed for 300 cycles at 20° C. The ratio of the 1 C discharge capacity after the 300 cycles with respect to the initial 1 C discharge capacity was designated as a 1 C charge and discharge cycle retention rate.

In the case where $LiNi_{1/3}Co_{1/3}Mn_{1/3}O_2$ was used as the positive electrode active substance and $Li_4Ti_5O_{12}$ was used as the negative electrode active substance, a cycle in which CC (constant current) charging was conducted until 2.9 V at a current density corresponding to 1 C, subsequently switched to CV (constant voltage) charging at 2.9 V and a charging was conducted for 1.5 hours, and then CC discharging was conducted until 1.0 V at a current density corresponding to 1 C, was performed for 300 cycles at 20° C. The ratio of the 1 C discharge capacity after the 300 cycles with respect to the initial 1 C discharge capacity was designated as a 1 C charge and discharge cycle retention rate.

In the case where $LiNi_{1/3}Co_{1/3}Mn_{1/3}O_2$ was used as the positive electrode active substance and SiO was used as the negative electrode active substance, a cycle in which CC (constant current) charging was conducted until 4.2 V at a current density corresponding to 1 C, subsequently switched to CV (constant voltage) charging at 4.2 V and a charging was conducted for 1.5 hours, and then CC discharging was conducted until 2.7 V at a current density corresponding to 1 C, was performed for 50 cycles at 20° C. The ratio of the 1 C discharge capacity after the 50 cycles with respect to the initial 1 C discharge capacity was designated as a 1 C charge and discharge cycle retention rate.

TABLE 9

| | Evaluation of battery | |
|---|---|---|
| | Cell impedance (mΩ/1 kHz) | Capacity retention rate after charge and discharge cycle characteristics (%) |
| Ex. 1-17 | 185 | 96 |
| Ex. 1-18 | 180 | 97 |
| Ex. 1-19 | 200 | 94 |
| Ex. 1-20 | 192 | 96 |
| Ex. 1-21 | 196 | 95 |
| Ex. 1-22 | 198 | 96 |
| Ex. 1-23 | 198 | 95 |
| Ex. 1-24 | 185 | 97 |
| Ex. 1-25 | 189 | 96 |
| Ex. 1-26 | 188 | 96 |

TABLE 9-continued

| | Evaluation of battery | |
|---|---|---|
| | Cell impedance (mΩ/1 kHz) | Capacity retention rate after charge and discharge cycle characteristics (%) |
| Ex. 1-27 | 192 | 96 |
| Ex. 1-28 | 201 | 95 |
| Ex. 1-29 | 184 | 97 |
| Ex. 1-30 | 197 | 96 |
| Ex. 1-31 | 201 | 94 |
| Ex. 1-32 | 187 | 97 |
| Ex. 1-33 | 188 | 97 |
| Comp. Ex. 1-12 | 390 | 50 or lower |
| Comp. Ex. 1-13 | 350 | 71 |
| Comp. Ex. 1-14 | 310 | 79 |
| Comp. Ex. 1-15 | 265 | 84 |
| Comp. Ex. 1-16 | 245 | 86 |
| Comp. Ex. 1-17 | 278 | 80 |
| Comp. Ex. 1-18 | 245 | 88 |
| Comp. Ex. 1-19 | 293 | 76 |
| Comp. Ex. 1-20 | 250 | 89 |
| Comp. Ex. 1-21 | 254 | 88 |

TABLE 10

| | Evaluation of battery | |
|---|---|---|
| | Cell impedance (mΩ/1 kHz) | Capacity retention rate after charge and discharge cycle characteristics (%) |
| Ex. 2-17 | 195 | 95 |
| Ex. 2-18 | 197 | 96 |
| Ex. 2-19 | 201 | 96 |
| Ex. 2-20 | 190 | 96 |
| Ex. 2-21 | 200 | 95 |
| Ex. 2-22 | 202 | 95 |
| Ex. 2-23 | 198 | 96 |
| Ex. 2-24 | 195 | 97 |
| Ex. 2-25 | 198 | 96 |
| Ex. 2-26 | 190 | 96 |
| Ex. 2-27 | 201 | 95 |
| Ex. 2-28 | 210 | 93 |
| Ex. 2-29 | 195 | 97 |
| Ex. 2-30 | 209 | 94 |
| Ex. 2-31 | 206 | 95 |
| Ex. 2-32 | 188 | 96 |
| Ex. 2-33 | 191 | 97 |
| Comp. Ex. 2-11 | 360 | 50 or lower |
| Comp. Ex. 2-12 | 280 | 82 |
| Comp. Ex. 2-13 | 320 | 70 |
| Comp. Ex. 2-14 | 238 | 88 |
| Comp. Ex. 2-15 | 254 | 82 |
| Comp. Ex. 2-16 | 230 | 89 |
| Comp. Ex. 2-17 | 303 | 72 |
| Comp. Ex. 2-18 | 230 | 88 |
| Comp. Ex. 2-19 | 226 | 89 |

It is understood from Tables 9 and 10 that, as compared to the use of conventionally used styrene-butadiene rubber or polyvinylidene fluoride, the use of the polyurethane water dispersions of the present invention provides more excellent bindability, lower cell impedance, and higher retention of capacity retention rate after the cycle characteristics.

INDUSTRIAL APPLICABILITY

The binder of the present invention can be utilized as a binder for an electrode of a lithium secondary battery, and an electrode produced therewith may be used for production of various lithium secondary batteries. The resulting lithium secondary batteries can be used in various portable equipments, such as a mobile phone, a notebook personal computer, a personal digital assistant (PDA), a video camera, and a digital camera, and also as a medium-sized or large-sized lithium secondary battery to be mounted on an electric power-assisted bicycle, an electrically powered automobile and the like.

The invention claimed is:

1. A binder for an electrode of a lithium secondary battery, comprising a water dispersion of a polyurethane formed of
    (A) a polyisocyanate that contains an alicyclic isocyanate and/or an aromatic isocyanate,
    (B) a compound having two or more active hydrogen groups comprising 40% by mass or more and 90% by mass or less with respect to the polyurethane of an olefinic polyol and, optionally, a polycarbonate diol having a carbon number between carbonate bond chains of less than 6,
    wherein the olefinic polyol is at least one selected from polybutadiene polyol, polyisoprene polyol, hydrogenated polybutadiene polyol, and hydrogenated polyisoprene polyol,
    (C) a compound having one or more active hydrogen groups and a hydrophilic group, and
    (D) a chain extending agent,
    wherein the polyurethane has a crosslinking density of 0.01 or more and 0.50 or less per 1,000 molecular weight of the polyurethane.

2. The binder for an electrode of a lithium secondary battery according to claim 1, wherein the polyurethane has a urethane bond equivalent of 200 g/eq or more and 2,000 g/eq or less.

3. The binder for an electrode of lithium secondary battery according to claim 1, wherein the (C) compound having one or more active hydrogen groups and a hydrophilic group contains a carboxyl group as the hydrophilic group.

4. An electrode produced by using the binder for an electrode of a lithium secondary battery described in claim 1.

5. A lithium secondary battery comprising the electrode described in claim 4.

* * * * *